(12) United States Patent
Prasad et al.

(10) Patent No.: US 7,852,802 B2
(45) Date of Patent: Dec. 14, 2010

(54) JOINT SCHEDULING AND GROUPING FOR SDMA SYSTEMS

(75) Inventors: Narayan Prasad, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 733 days.

(21) Appl. No.: 11/554,957

(22) Filed: Oct. 31, 2006

(65) Prior Publication Data

US 2007/0105595 A1 May 10, 2007

Related U.S. Application Data

(63) Continuation-in-part of application No. 11/428,386, filed on Jul. 1, 2006.

(60) Provisional application No. 60/731,884, filed on Oct. 31, 2005, provisional application No. 60/732,870, filed on Nov. 2, 2005.

(51) Int. Cl.
  *H04W 4/00* (2009.01)
(52) U.S. Cl. ............... 370/328; 370/329; 455/132; 455/272
(58) Field of Classification Search ............... None
  See application file for complete search history.

(56) References Cited

U.S. PATENT DOCUMENTS

| | | | | |
|---|---|---|---|---|
| 7,047,016 B2* | 5/2006 | Walton et al. | ............ | 455/452.1 |
| 7,197,282 B2* | 3/2007 | Dent et al. | ............ | 455/67.14 |
| 2003/0223391 A1* | 12/2003 | Malaender et al. | ......... | 370/334 |
| 2006/0229017 A1* | 10/2006 | Larsson et al. | ............ | 455/63.1 |
| 2007/0004366 A1* | 1/2007 | Prasad et al. | ............ | 455/272 |
| 2007/0054621 A1* | 3/2007 | Larsson | ........... | 455/67.11 |

OTHER PUBLICATIONS

Varansai, Mahesh; "Group Detection for Synchronous Gaussian Code-Division Multiple-Access Channels", IEEE Transaction on Information Theory, vol. 41, No. 4, Jul. 1995, pp. 1083-1096.*
Zhang, Ruifeng, "Optimal Space-Time Packet Scheduling for Reservation Aloha Networks", Vehiclular Technology Conference 2001, VTC 2001-Fall. IEEE VT5 54th, vol. 4 Oct. 7-11, 2001, pp. 2188-2191 vol. 4.*

* cited by examiner

*Primary Examiner*—Rafael Pérez-Gutiérrez
*Assistant Examiner*—Daniel Nobile
(74) *Attorney, Agent, or Firm*—Jeffery Brosemer; Chris Kolefas; Joseph Kolodka

(57) ABSTRACT

A joint scheduling and grouping technique provides uplink throughput maximization for space-division multiple access (SDMA) systems under proportional fairness constraints. In a slow-fading narrowband MIMO multiple access channel (MAC) multiple users, each equipped with multiple transmit antennas, communicate to a receiver equipped with multiple receive antennas. The users are unaware of the channel state information (CSI) whereas the receiver has perfect CSI and employs a successive group decoder (SGD). For an open-loop system, an optimum successive group decoder (OSGD) simultaneously minimizes the common outage probability and the individual outage probability of each user, over all SGDs of permissible decoding complexity. For each channel realization, the OSGD maximizes the error exponent of the decodable set of users. An adaptive SGD retains the outage optimality of the OSGD and minimizes decoding complexity. The SGD yields symmetric capacity gains commensurate with the decoding complexity allowed. The OSGD offers significantly improved performance at low decoding complexity.

12 Claims, 12 Drawing Sheets

JOINT SCHEDULING AND GROUPING FOR SDMA SYSTEMS

CROSS REFERENCE TO RELATED APPLICATIONS

This application claims the benefit under 35 U.S.C. §119 of U.S. Provisional Application No. 60/731,884, filed Oct. 31, 2005, U.S. Provisional Application No. 60/732,870, filed Nov. 2, 2005, and U.S. patent application Ser. No. 11/428,386 filed on Jul. 1, 2006, the entire contents and file wrappers of which are hereby incorporated by reference for all purposes into this application.

FIELD OF THE INVENTION

The present invention relates to the field of wireless communications, particularly cellular wireless communications employing space-division multiple access (SDMA).

BACKGROUND INFORMATION

Over a wireless multiple-input-multiple-output (MIMO) multiple access channel (MAC), several users (mobiles) communicate simultaneously to a common receiver, known in cellular communications as the base-station. Uplink space-division multiple access (SDMA), where multiple users of the same sector/cell share the same set of resources at a given time, coupled with advanced receiver processing at the base-station can lead to a dramatic increase in system throughput. Traditionally, strictly orthogonal (non-SDMA) uplink systems such as TDMA/FDMA have been preferred since the simple, albeit sub-optimal, match filter receivers employed at base-stations so far are not suitable for SDMA. The advent of multiple receive antennas at the base-station, however, and improvements in technology have made possible the use of advanced receiver processing and hence SDMA. Consequently, quasi-orthogonal OFDMA and IFDMA, where subsets of users are allocated the same resources, are being proposed to accommodate ambitious future throughput requirements. A challenge is to design scheduling and receiver processing algorithms that garner most of the throughput increase promised by SDMA but with practically feasible complexities.

SDMA is also being considered to obtain throughput improvements in downlink systems where the transmitter (base-station) as well as each user have multiple antennas. Multi-stream MIMO schemes have been proposed, where over each resource block, the base-station transmits multiple independent streams to the intended user. Note that there is a direct analogy between independent single-antenna users in the SDMA uplink and the independent multiple streams in the downlink. The role of the base-station in the uplink is assumed by the intended multiple-receive-antenna user in the downlink. A challenge again is to obtain the throughput increase promised by SDMA with practically feasible complexities.

Other studies have looked into the scheduling (i.e. rate-assignment) problem for minimum mean square error (MMSE)-based successive interference cancellers (SIC). Although in theory, a MMSE-SIC decoder is (sum) capacity achieving for an SDMA configuration, in practice, a more advanced receiver such as an MMSE-based successive group decoder (SGD) may considerably increase throughput. In a practical system, the transmission rate for each user is chosen from a finite set of limited granularity, therefore, for each channel realization, the number of possible rates for a general successive group decoder is greater because its capacity region is larger than that of MMSE-SIC. As a result, a rate-assignment having a higher sum can be chosen and fed back to the users.

On a flat-fading MAC, due to stringent delay-constraints, each transmitted codeword experiences just one (or few) fading realization(s). Outage probability has emerged as a useful tool for such non-ergodic (slow-fading) settings. For a MAC where only the receiver has perfect channel state information (CSI), an outage can be declared simultaneously for all users if the rate vector containing the information rates of all (active) users lies outside the instantaneous achievable rate region, which in turn is a function of the instantaneous channel state and the decoder used. Occurrence of this outage event, henceforth referred to as the common outage, indicates that a joint error event (i.e., event that at least one user is decoded erroneously) is very likely and the common outage probability, denoted by $Pr(\mathcal{O})$, represents an achievable joint or frame error probability (FEP). $Pr(\mathcal{O})$ was derived in D. N. C. Tse et al. "Diversity-multiplexing tradeoff in multiple-access channels," *IEEE Trans. Inform. Theory*, vol. 50, no. 9, pp. 1859-1874, September 2004 for the case where the receiver employs the optimum joint decoder, and in N. Prasad et al., "Outage based analysis for MultiaccessNV-BLAST architecture over MIMO block Rayleigh fading channels," *Proc. Allerton Conf. on Comm., Control, and Comput.*, Monticello, Ill., October 2003, University of Illinois where the receiver employs successive decoders.

A finer outage formulation, in which an individual outage can be declared for each user, was developed in L. Li, N. Jindal et al., "Outage capacities and optimal power allocation for fading multiple-access channels," *IEEE Trans. Inform. Theory*, vol. 51, no. 4, pp. 1326-47, April 2005 for the scenario where in addition to the receiver, each transmitting user has perfect CSI. Unfortunately, the absence of CSI at the user end considerably complicates the individual outage formulation. Essentially, the receiver should declare an individual outage for each user that it deems cannot be reliably decoded for the current channel state. Declaring a common outage for all users is very conservative since the receiver does not wish to make even a single error. On the other hand, an aggressive approach may yield a set of individual (per-user) outage probabilities that is not achievable (i.e., error probabilities arbitrarily close to these outage probabilities cannot be attained) and hence of little use. Obtaining a "good" set of achievable individual outage probabilities, where many if not all are smaller than the common outage probability, is difficult for the successive decoder due to the intractability of precisely modeling error propagation and is not known for the maximum likelihood (ML) decoder.

Successive group decoders (SGDs) were introduced in M. K. Varanasi, "Group detection for synchronous gaussian code-division multiple-access channels," *IEEE Trans. Inform. Theory*, vol. 41, no. 4, pp. 1083-1096, July 1995, for the uncoded Gaussian CDMA channel, and are an extension of the conventional successive decoder in that at each decoding stage a subset of users can be jointly decoded instead of just one. The useful feature of such decoders is that they provide the system designer with a broad choice, spanning from the low-complexity successive decoder to the high-complexity ML decoder. Moreover, they are inherently better suited to a MAC (as opposed to the MIMO point-to-point system) since coding across transmitters (users) is not possible.

A SISO point-to-point channel is considered in S. A. Jafar et al., "Throughput maximization with multiple codes and partial outages," in *Proc. IEEE Global Telecommun. Conf.*, San Antonio, Tex., 2001 (hereinafter "Jafar et al.), where the transmitter employs multiple codes and the receiver uses the successive decoder. The successive decoder in Jafar et al. stops decoding at the first instance when an outage occurs, i.e., when the effective (scalar) channel cannot support the rate, and outages are declared for the current and remaining codes.

A joint decoder for a two-user symmetric MAC is proposed in S. Shamai et al., "A broadcast approach for a single-user slowly fading MIMO channel," *IEEE Trans. Inform. Theory*, vol. 49, no. 10, pp. 2617-2635, October 2003, which works as follows. It first determines if both users can be decoded reliably via the ML decoder, if not it checks if any one of the users can be decoded reliably via either one of the two successive decoders (defined by decoding orders {1,2} and {2,1}, respectively) after treating the other user as a Gaussian interferer. Outage is declared for users deemed undecodable.

SUMMARY OF THE INVENTION

In an exemplary embodiment, the present invention provides outage formulations for successive group decoders (SGDs) and parallel group decoders (PGDs) over an open-loop SDMA uplink. Using these formulations, the achievable common and individual outage probabilities for SGDs and PGDs are obtained and an optimal SGD (OSGD) as well as an optimal PGD (OPGD) are derived which simultaneously minimize these probabilities and maximize the error exponent over all SGDs and PGDs, respectively, of permissible decoding complexities.

In an aspect of the present invention, a greedy algorithm which determines the OSGD is obtained which drastically reduces the complexity of determining the optimal partition. Two other exemplary greedy algorithms are proposed which further reduce the complexity and yield SGDs which are optimal with respect to the common and individual outage probabilities.

An adaptive SGD is derived which is optimal with respect to the common and individual outage probabilities and also minimizes the expected (average) decoding complexity.

An exemplary embodiment of the present invention is directed to a joint scheduling and grouping technique for throughput maximization for an uplink SDMA system under proportional fairness constraints in which the receiver (e.g., a base-station) employs successive group decoding. The receiver is equipped with multiple receive antennas and can communicate with each user via a limited capacity downlink channel, a situation which is typical of emerging cellular base-stations. The maximum tolerable decoding complexity and the (uplink) channel realizations (of all users) can be specified as inputs. The optimal set of user rates can then be determined along with a successive group decoder of permissible decoding complexity.

In a further aspect of the present invention, two near-optimal greedy techniques of greatly reduced complexity are disclosed which result in negligible loss in throughput. As a consequence of the analogy between the SDMA uplink and multi-stream MIMO downlink mentioned above, the optimal and near optimal approaches can be extended to the latter schemes as well. Notably, the techniques can be extended beyond the context of an SDMA uplink.

The present invention provides optimal as well as near-optimal scheduling and grouping techniques suitable for emerging SDMA-based cellular uplink as well as multi-stream MIMO downlink schemes. Scheduling and grouping techniques in accordance with the present invention result in substantial throughput improvements while satisfying specified decoding complexity constraints.

As mentioned above, other work has considered scheduling (rate-assignment) and ordering algorithms for a MMSE-SIC decoder which is an extreme case (having the lowest complexity) of a SGD, as considered herein. However developing an optimal grouping and scheduling algorithm for the general case requires an entirely new formulation. Moreover, allowing for a slight increase in decoding complexity allows for dramatic throughput gains in practical systems where each user has only a small number of codebooks of distinct rates.

Finally, asymptotically tight (in the limit of high SNR) affine approximations to the performance metrics relevant for the OSGD are obtained. These bounds capture the effects of relevant channel parameters and decoding complexity constraints. Limiting expressions for the relevant capacities when the number of users and the number of receive antennas approach infinity are obtained and it is shown that an SGD yields symmetric capacity gains commensurate with the decoding complexity allowed.

The aforementioned and other features and aspects of the present invention are described in greater detail below.

DETAILED DESCRIPTION

1 Introduction

Figure 1:
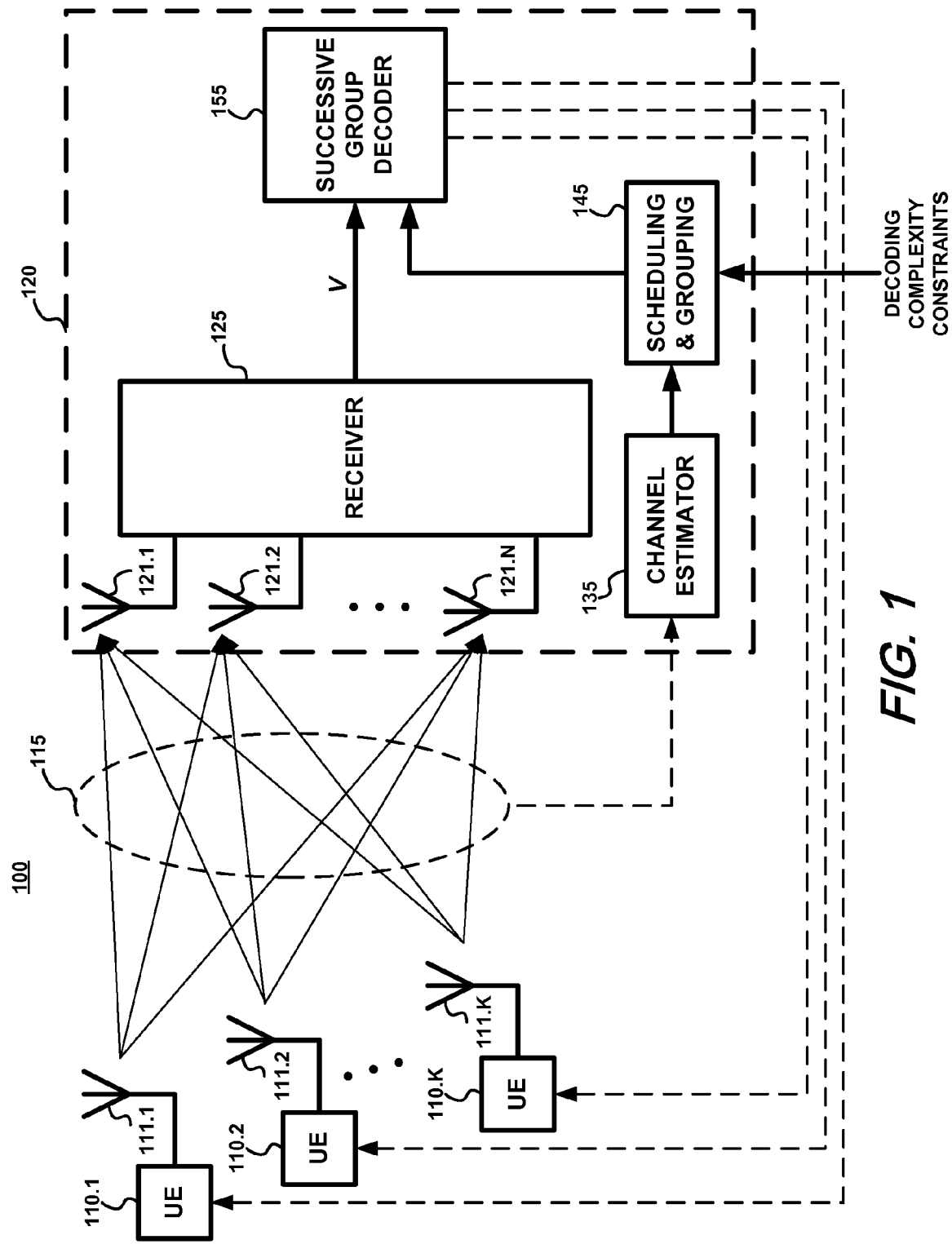
FIG. 1 is a schematic representation of a communications system comprising an SDMA uplink channel in which the receiver employs throughput-maximizing scheduling and grouping in accordance with an embodiment of the present invention.

FIG. 1 provides a schematic representation of a communications system 100 comprising an SDMA uplink channel. The system 100 comprises one or more user equipment (UE) 110.1-110.K, and a base station 120. Each UE 110 has a transmitting antenna 111 and the base station 120 has multiple receiving antennas 121.1-121.N coupled to a receiver 125. The base station 120 also includes a channel estimator 135, a scheduling and grouping element 145, and a successive group decoder (SGD) 155. The system employs a scheduling and grouping technique in accordance with an exemplary embodiment of the present invention to be described in greater detail.

As shown in FIG. 1, one or more feedback channels may be provided from the base station 120 to the one or more UE 110. In existing systems, any such feedback channels are typically limited in bandwidth. The absence of feedback channels results in an open-loop system. In an exemplary open-loop SDMA system, the UE transmit using constant rate codebooks.

In an exemplary embodiment of the present invention, channel estimator 135 provides an estimate of the uplink channel to the scheduling and grouping element 145. The scheduling and grouping element 145 also receives decoding complexity constraints as inputs. These inputs can be specified, for instance, as the maximum number of users that can be jointly decoded at each stage in the SGD. Based on these inputs, an optimal rate vector along with a partition of active UEs for successive group decoding can be determined. The optimal rate vector is a vector containing the rate assignment of each UE 110. The rate assigned to each UE 110 is one of a finite set of distinct rates at which the UE can transmit on the uplink to the base station 120. Each UE 110 is informed of the rate assigned to it over the current scheduling block via the limited capacity feedback channel. A UE 110 assigned a rate of zero is not scheduled for the current scheduling block and is deemed inactive. In open-loop systems, all users are active and the rate vector is constant. In this case, the scheduling and grouping element is only a grouping element and only a partition of UEs for either successive group decoding or parallel group decoding is determined.

The SGD 155 (specified by the partition of active users selected), always satisfies the imposed complexity constraints. Consider a system with four UEs indexed by (1,2,3,4). A partition of (1,2,3,4) is a collection of disjoint subsets whose union is (1,2,3,4). For example $\{(1,2),(3,4)\}$ is a partition. Further, the SGD using the partition $\{(1,2),(3,4)\}$ would jointly decode users (1,2) first followed by users (3,4). Note that the order of subsets in the partition is important for an SGD but not for a PGD.

In an exemplary embodiment of the present invention, the scheduling and grouping element 145 is implemented in accordance with exemplary, near-optimal greedy scheduling and grouping schemes. The schemes are described below in greater detail.

To illustrate, consider a system with four UEs indexed by (1,2,3,4). If each UE can communicate using only one rate, then feedback of one bit per UE is needed for each scheduling block and the scheduling process corresponds to a simple on-off scheduling. If the decoding complexity is constrained by allowing only partitions having maximum group size $|G|_{max}=2$, there are 42 possible partitions of all four users (such as $(\{1,2\},\{3,4\})$, $(\{3,4\},\{1,2\})$, etc.) Since each user can be assigned a rate of zero or a single positive rate, there are 16 possible rate allocations for each partition.

In accordance with a derived metric, an optimal scheduling and grouping approach will pick the optimal rate-allocation and the partition among these 16×42 possibilities. The aforementioned greedy scheduling and grouping schemes will pick a near-optimal rate allocation and partition after evaluating only a significantly reduced set of possibilities. The SGD employed by the base-station for that block is uniquely defined by the optimal partition of active users and satisfies the decoding complexity constraint. Note that the partition used by the SGD can change dynamically based on the channel realizations.

Figure 2:
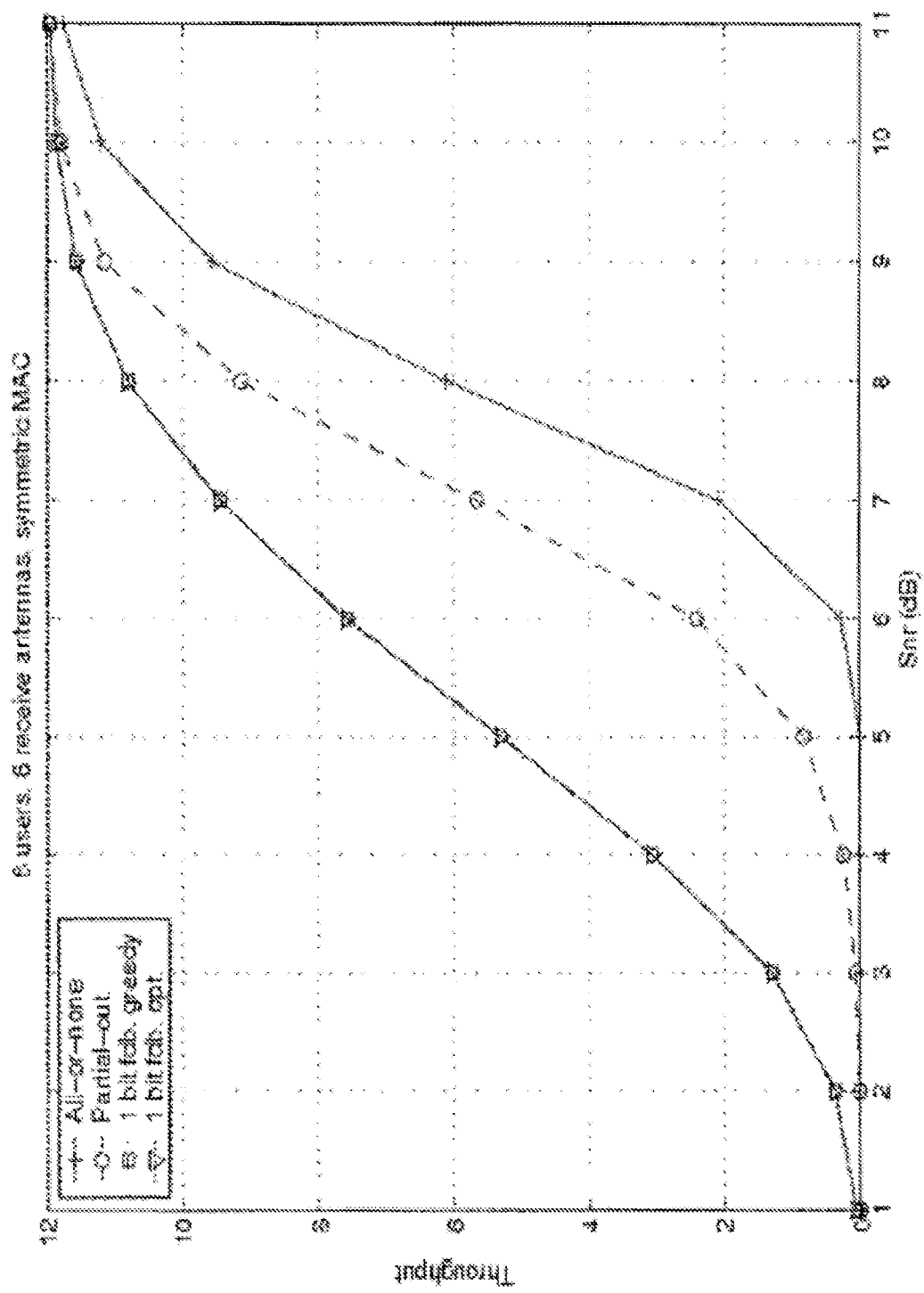
FIG. 2 is a chart of throughput versus signal-to-noise-ratio (SNR) for a six-user multiple access channel with six receive antennas at a base-station employing exemplary joint scheduling and grouping algorithms.

FIG. 2 is a graph of throughput versus signal-to-noise-ratio (SNR) which shows the performance of exemplary joint scheduling and grouping algorithms in accordance with the present invention and that of an exemplary optimal grouping algorithm, which is described below. The exemplary optimal grouping algorithm was designed for an open-loop system where there are no feedback channels and is also optimal for systems in which the base-station employs a simple round-robin scheduler having one bit of feedback from the base-station to each user per-transmission frame.

FIG. 2 plots the two throughputs yielded by the exemplary open-loop grouping algorithm (+ signs and circles) where "all-or-none" indicates the throughput obtained when the base-station declares a common outage and discards all packets even if one packet is in error (decoded incorrectly) and "partial-out" indicates the throughput obtained when only the packets deemed to be in error by the base-station are discarded and individual outages are declared for corresponding users. Also plotted in FIG. 2 is the throughput obtained with an exemplary optimal scheduling and grouping algorithm with only one-bit per user feedback (triangles). In all cases, the decoding complexity is constrained by setting the maximum group size to 2. The throughput obtained with an exemplary greedy scheduling and grouping algorithm is also plotted (squares). It is seen from FIG. 2 that even a one bit per-user feedback results in dramatic gains and the performance of the exemplary greedy scheduling and grouping algorithm of the present invention is indistinguishable from that of the optimal scheduling and grouping algorithm.

More detailed descriptions of an SGD, an optimal SGD (OSGD) and a joint scheduling and grouping algorithm in accordance with the present invention are provided below.

2 Successive Group Decoder (SGD)

2.1 MIMO MAC Model

A discrete-time model of a slow-fading narrowband multiple access channel (MAC) is first considered. As shown in FIG. 1, the base-station 120 has $N \geq 1$ receive antennas and communicates with K users over the MAC 115. The $k^{th}$ user has $m_k \geq 1$ transmit antennas. The channel output is as follows:

$$Y = HQ^{\frac{1}{2}}X + V. \quad (1)$$

The random matrix $H=[H_1, \ldots, H_K]$ stays constant for J symbol intervals (the coherence interval) after which it switches to an independent value. It is assumed H is known perfectly to the receiver 120 but is unknown to the transmitters 110. Y is the N×J received signal matrix and the (effective) fading is described by the $$N \times \left(\sum_{k=1}^{K} m_k\right)$$

matrix H drawn from some continuous distribution. In the presence of inter-cell interference, typically modeled as a spatially colored Gaussian vector, (1) models the output post whitening.

The N×J matrix V represents additive noise at the receiver and is assumed to have i.i.d. $\mathcal{CN}(0,1)$ elements. $Q=\mathrm{diag}\{Q_1, \ldots, Q_K\}$ is a block-diagonal matrix with $\mathrm{tr}(Q_k)$ representing the average transmit power used by the $k^{th}$ user. The $$\left(\sum_{k=1}^{K} m_k\right) \times J$$

matrix X can be partitioned as $X=[X_1^T, \ldots, X_K^T]^T$ and the $m_k \times J$ matrix $$Q_k^{\frac{1}{2}} X_k$$

represents the input from the $k^{th}$ user and is transmitted over J consecutive symbol intervals. In particular, $X_k$ is drawn equiprobably from a Gaussian codebook of rate $R_k$ and covariance $I_{m_k}$.

2.2 SGD Model

The successive group decoder (SGD) is an extension of the standard successive decoder in that at each stage a subset of users is jointly decoded after treating the transmissions of the remaining users as Gaussian interference. Formally, to define group decoders we introduce a bounding function $f(.)$ whose purpose is to impose the decoding complexity constraints. Let $\mathcal{S}$ denote the set of all non-empty subsets of $\{1, \ldots, K\}$. Then we define a function $f:\mathcal{S}\to\{0,1\}$, such that for any subset $\mathcal{J}\in\mathcal{S}$, $f(\mathcal{J})=1$ means that at any decoding stage, the users in $\mathcal{J}$ can be jointly decoded, whereas $f(\mathcal{J})=0$ means that at no stage is the joint decoding of $\mathcal{J}$ allowed. We further impose the reasonable restriction on $f(.)$ that if $f(\mathcal{J})=1$ then $f(\mathcal{G})=1, \forall \mathcal{G}\subseteq \mathcal{J}$. Examples of bounding functions include:

$$f(\mathcal{J}) = \begin{cases} 1, & |\mathcal{J}| \leq \mu_{\max}, \\ 0, & \text{otherwise,} \end{cases}$$

corresponding to size control, and $$f(\mathcal{J}) = \begin{cases} 1, & \sum_{j\in\mathcal{J}} R_j \leq r_{sum}, \\ 0, & \text{otherwise,} \end{cases}$$

corresponding to sum rate control.

Next, for a given bounding function $f(.)$, an ordered partition $\mathcal{G}=\{\mathcal{G}_1, \ldots, \mathcal{G}_p\}$ of $\{1, \ldots, K\}$ is deemed valid if $f(\mathcal{G}_k)=1, 1\leq k \leq p$. Let z,961 be the set of all valid ordered partitions and define $$\tilde{H} \triangleq HQ^{\frac{1}{2}}.$$

For any subset $\mathcal{A}\subseteq\{1, \ldots, K\}$, let $R_\mathcal{A}$ denote the vector of rates of users with indices in $\mathcal{A}$. Then, for any two disjoint subsets $\mathcal{A}$ and $\mathcal{B}$ of $\{1, \ldots, K\}$, let $\mathcal{C}(\tilde{H},\mathcal{A},\mathcal{B})$ denote the instantaneous achievable-rate region for users in $\mathcal{A}$ decoded using an ML decoder, after assuming users in $\mathcal{B}$ to be additive Gaussian interferers. In particular, denoting $\tilde{H}_\mathcal{A} \triangleq [\tilde{H}_j]_{j\in\mathcal{A}}$, we have that:

$$C(\tilde{H}, \mathcal{A}, \mathcal{B}) = \left\{r \in \mathbb{R}_+^{|\mathcal{A}|}: \sum_{j\in\mathcal{D}} r_j < I(x_\mathcal{D}; y|x_{\mathcal{A}\setminus\mathcal{D}}), \forall \mathcal{D} \subseteq \mathcal{A}\right\}, \quad (2)$$

where:

$$I(x_\mathcal{D}; y|x_{\mathcal{A}\setminus\mathcal{D}}) = \log\left|I + \tilde{H}_\mathcal{D}^\dagger (I + \tilde{H}_\mathcal{B}\tilde{H}_\mathcal{B}^\dagger)^{-1} \tilde{H}_\mathcal{D}\right|.$$

Then for any valid ordered partition $\{\mathcal{G}_1, \ldots, \mathcal{G}_p\}$, an exemplary embodiment of an SGD operates as follows:

1. Initialize with inputs: $k=1$, $\tilde{H}$, R, $\{\mathcal{G}_1, \ldots, \mathcal{G}_p\}$.
2. Check condition $R_{\mathcal{G}_k} \in \mathcal{C}(\tilde{H}, \mathcal{G}_k, \cup_{j=k+1}^p \mathcal{G}_j)$.
3. If check is true,
   a) Compute $$\Sigma_{\mathcal{G}_k} = I + \sum_{j=k+1}^{p} \tilde{H}_{\mathcal{G}_j} \tilde{H}_{\mathcal{G}_j}^\dagger$$

and decode users in $\mathcal{G}_k$ according to $$\hat{X}_{\mathcal{G}_k} = \arg\min_{X_{\mathcal{G}_k}} \left\| \Sigma_{\mathcal{G}_k}^{-\frac{1}{2}} (Y - \tilde{H}_{\mathcal{G}_k} X_{\mathcal{G}_k}) \right\|^2. \quad (3)$$

b) Update $Y = Y - \tilde{H}_{\mathcal{G}_k}\hat{X}_{\mathcal{G}_k}$ and $k=k+1$.
   c) If $k=p+1$ stop, else go to step 2.
4. If check is false, declare individual outages for all users in $\cup_{j=k}^p \mathcal{G}_j$ or a common outage for every user.

Thus, with this exemplary embodiment, a common outage for all users, denoted by $\mathcal{O}$, occurs if the following holds true:

$$\cup_{k=1}^p R_{\mathcal{G}_k} \notin \mathcal{C}(\tilde{H}, \mathcal{G}_k, \cup_{j=k+1}^p \mathcal{G}_j)\}, \quad (4)$$

whereas an individual outage for user $k\in\mathcal{G}_q$, denoted by $\mathcal{O}_k$, occurs if $$\cup_{j=1}^q \{R_{\mathcal{G}_j} \notin \mathcal{C}(\tilde{H}, \mathcal{G}_j, \cup_{s=j+1}^p \mathcal{G}_s)\}, \quad (5)$$

holds true. From (4) and (5) it is evident that both outage events depend strongly on the chosen ordered partition. For the given rate-tuple R and a bounding function $f(.)$, the exemplary SGD can employ any valid ordered partition. Note that as opposed to other SGDs, with the exemplary SGD, only the users not in outage are decoded. This is a desirable feature since an outage should be declared for a user if the likelihood of decoding it incorrectly is high, and in that event it makes sense to not expend system resources in decoding that user.

A special case arises when there is only one group $\{1, \ldots K\}$ and for this case it is clear that the individual and common outage events are identical, i.e., when $R \notin \mathcal{C}(\tilde{H}, \{1, \ldots, K\}, \phi)$, a common outage as well as an individual outage is declared for all users. Henceforth, we refer to the SGD corresponding to this partition as the ML decoder since the decoding (done under the non-outage event) is maximum likelihood. Although the decoder is not ML for channels in outage, it represents a natural counterpart of the true ML decoder within our framework of decoding only users not in outage.

Another special case is when the SGD uses an ordered partition with all groups of size 1. This decoder is a counterpart of the standard MMSE successive interference canceler (MMSE-SIC) decoder within the framework of decoding only users not in outage. As opposed to the standard MMSE-SIC decoder, however, the exemplary successive decoder stops decoding at the first instance that a user is found in outage. This allows defining outage events without making any simplifying assumptions about the nature of error propagation and, as a consequence, it is possible to rigorously prove the achievability of the resulting outage probabilities.

Note that the policy of not continuing to decode beyond the first user in outage is not too pessimistic. This follows since it is very likely that a decoding error occurs for the first user in outage and if that erroneous decision is fed back, the likelihood of making decoding errors for subsequent users also becomes high.

It is desirable to determine the optimal grouping (partitioning) function, which for every channel realization returns a valid ordered partition such that the resulting outage probabilities are minimized. Since the number of valid ordered partitions can be very large, it would be very useful if the optimal channel dependent partition(s) could be efficiently determined. For instance, with a maximum group size constraint, the cardinality of $\mathcal{Q}$ can be determined using standard combinatorial results to be:

$$|\mathcal{Q}| = \sum_{\substack{\{b_i \in \mathbb{Z}_+\}_{i=1}^{\mu_{max}} \\ \sum_{i=1}^{\mu_{max}} i b_i = K}} \frac{\left(\sum_{i=1}^{\mu_{max}} b_i\right)! K!}{b_1! \ldots b_{\mu_{max}}! (1!)^{b_1} \ldots (\mu_{max}!)^{b_{\mu_{max}}}}. \tag{6}$$

For the unconstrained case, letting $T_K$ denote the cardinality of all possible ordered partitions of K users, we have the recursion formula:

$$T_K = \sum_{i=0}^{K-1} \binom{K}{i} T_i, \tag{7}$$

$T_0 = 1$.

Note that $\{T_k, k=0, 1, \ldots\}$ can also be determined using the exponential generating function:

$$\sum_k \frac{T_k}{k!} x^k = \frac{1}{2 - \exp(x)}. \tag{8}$$

2.3 Error Exponent for SGD

An optimal SGD that maximizes the error exponent among all SGDs is described below. For practical systems, the choice of maximizing the error exponent is more appropriate than optimizing the outage performance alone. Moreover, this choice also leads to optimality in terms of outage probabilities and is a particularly useful metric for non-symmetric systems with different rates as opposed to other common measures that are independent of the users' rates, such as signal to interference plus noise ratio (SINR).

For any two disjoint subsets $\mathcal{A}$ and $\mathcal{B}$ of $\{1, \ldots, K\}$, let $\mathcal{E}_r(\tilde{H}, \mathcal{A}, \mathcal{B})$ denote the (multi-access) Gaussian random coding error exponent for joint decoding of users in $\mathcal{A}$ by assuming users in $\mathcal{B}$ to be additive Gaussian interferers. $\mathcal{E}_r(\tilde{H}, \mathcal{A}, \mathcal{B})$ is given by:

$$\mathcal{E}_r(\tilde{H}, \mathcal{A}, \mathcal{B}) = \tag{9}$$

$$\min_{\mathcal{D} \subseteq \mathcal{A}} \max_{\rho \in [0,1]} \rho \left( \log \left| I + \frac{1}{1+\rho} \tilde{H}_\mathcal{D}^\dagger (I + \tilde{H}_\mathcal{B} \tilde{H}_\mathcal{B}^\dagger)^{-1} \tilde{H}_\mathcal{D} \right| - \sum_{j \in \mathcal{D}} R_j \right).$$

The following lemmas state two important properties of the error exponents that will be subsequently used.

Lemma 1: For any two disjoint subsets $\mathcal{A}, \mathcal{B} \in \mathcal{S}$ such that $\mathcal{A} \neq \phi$, $$\mathcal{E}_r(\tilde{H}, \mathcal{A}, \mathcal{B}) \geq 0 \tag{10}$$

with equality if and only if $R_\mathcal{A} \notin \mathcal{C}(\tilde{H}, \mathcal{A}, \mathcal{B})$.

The proof of Lemma 1 is as follows. For any subset $D \subseteq \mathcal{A}$, it can be shown that:

$$\max_{\rho \in [0,1]} \rho \left( \log \left| I + \frac{1}{1+\rho} \tilde{H}_\mathcal{D}^\dagger (I + \tilde{H}_\mathcal{B} \tilde{H}_\mathcal{B}^\dagger)^{-1} \tilde{H}_\mathcal{D} \right| - \sum_{j \in \mathcal{D}} R_j \right) = \tag{11}$$

$$0 \Leftrightarrow \log \left| I + \tilde{H}_\mathcal{D}^\dagger (I + \tilde{H}_\mathcal{B} \tilde{H}_\mathcal{B}^\dagger)^{-1} \tilde{H}_\mathcal{D} \right| \leq \sum_{j \in \mathcal{D}} R_j,$$

$$\max_{\rho \in [0,1]} \rho \left( \log \left| I + \frac{1}{1+\rho} \tilde{H}_\mathcal{D}^\dagger (I + \tilde{H}_\mathcal{B} \tilde{H}_\mathcal{B}^\dagger)^{-1} \tilde{H}_\mathcal{D} \right| - \sum_{j \in \mathcal{D}} R_j \right) > 0 \Leftrightarrow$$

$$\log \left| I + \tilde{H}_\mathcal{D}^\dagger (I + \tilde{H}_\mathcal{B} \tilde{H}_\mathcal{B}^\dagger)^{-1} \tilde{H}_\mathcal{D} \right| > \sum_{j \in \mathcal{D}} R_j$$

Then using (11) with (2) and (9), we can conclude that (10) must hold. We set $\mathcal{E}_r(\tilde{H}, \mathcal{A}, \mathcal{B}) = \infty$, when $\mathcal{A} = \phi$.

Lemma 2: For all subsets $\tilde{\mathcal{A}} \subseteq \mathcal{A}$ and $\tilde{\mathcal{B}} \subseteq \mathcal{B}$:

$$\mathcal{E}_r(\tilde{H}, \mathcal{A}, \mathcal{B}) \leq \mathcal{E}_r(\tilde{H}, \tilde{\mathcal{A}}, \tilde{\mathcal{B}}) \tag{12}$$

The proof of Lemma 2 is a follows. From (9) it is evident that since $\tilde{\mathcal{A}} \subseteq \mathcal{A}$, $$\mathcal{E}_r(\tilde{H}, \mathcal{A}, \mathcal{B}) \leq \mathcal{E}_r(\tilde{H}, \tilde{\mathcal{A}}, \mathcal{B}). \tag{13}$$

Moreover, since $\tilde{\mathcal{B}} \subseteq \mathcal{B}$, $I + \tilde{H}_\mathcal{B} \tilde{H}_\mathcal{B}^\dagger \succeq I + \tilde{H}_{\tilde{\mathcal{B}}} \tilde{H}_{\tilde{\mathcal{B}}}^\dagger$ where $\succeq$ denotes positive semi-definite ordering, so that:

$$\tilde{H}_\mathcal{D}^\dagger (I + \tilde{H}_\mathcal{B} \tilde{H}_\mathcal{B}^\dagger)^{-1} \tilde{H}_\mathcal{D} \preceq \tilde{H}_\mathcal{D}^\dagger (I + \tilde{H}_{\tilde{\mathcal{B}}} \tilde{H}_{\tilde{\mathcal{B}}}^\dagger)^{-1} \tilde{H}_\mathcal{D}, \tag{14}$$

which implies that for all $\rho \geq 0$:

$$I + \frac{1}{1+\rho}\tilde{H}_{\mathcal{D}}^\dagger(I + \tilde{H}_{\mathcal{B}}\tilde{H}_{\mathcal{B}}^\dagger)^{-1}\tilde{H}_{\mathcal{D}} \preceq I + \frac{1}{1+\rho}\tilde{H}_{\mathcal{D}}^\dagger(I + \tilde{H}_{\mathcal{B}}\tilde{H}_{\mathcal{B}}^\dagger)^{-1}\tilde{H}_{\mathcal{D}}. \quad (15)$$

(12) follows directly from (13) and (15).

For any valid ordered partition $\underline{\mathcal{G}} = \{\mathcal{G}_1, \ldots, \mathcal{G}_p\} \in \underline{\mathcal{Q}}$, let $\mathcal{E}_r(\tilde{H}, \underline{\mathcal{G}})$ denote the error exponent, i.e., $$\mathcal{E}_r(\tilde{H}, \underline{\mathcal{G}}) = \min_{1 \leq k \leq p}\left\{\mathcal{E}_r\left(\tilde{H}, \mathcal{G}_k, \bigcup_{j=k+1}^p \mathcal{G}_j\right)\right\}. \quad (16)$$

Note that using (16) with Lemma 1, we have that $\mathcal{E}_r(\tilde{H}, \underline{\mathcal{G}}) = 0$ implies that for some $1 \leq k \leq p$, $R_{\mathcal{G}_k} \notin \mathcal{C}(\tilde{H}, \mathcal{G}_k, \bigcup_{j=k+1}^p \mathcal{G}_j)$ so that a common outage is declared for the ordered partition $\underline{\mathcal{G}}$.

The following lemma proves the common outage optimality of the ML decoder.

Lemma 3: The ML decoder minimizes the common outage probability, $\Pr(\mathcal{O})$, over all SGDs.

Lemma 3 can be proven by showing that for any ordered partition $\underline{\mathcal{G}} = \{\mathcal{G}_1, \ldots, \mathcal{G}_p\}$:

$$\mathcal{E}_r(\tilde{H}, \cup_{j=1}^p \mathcal{G}_j, \phi) = 0 \Rightarrow \mathcal{E}_r(\tilde{H}, \underline{\mathcal{G}}) = 0 \quad (17)$$

To prove (17) we first show that for any two disjoint subsets $\mathcal{A}, \mathcal{B} \in \mathcal{S}$, we have $$\mathcal{E}_r(\tilde{H}, \mathcal{A} \cup \mathcal{B}, \phi) = 0 \Rightarrow \min\{\mathcal{E}_r(\tilde{H}, \mathcal{A}, \mathcal{B}), \mathcal{E}_r(\tilde{H}, \mathcal{A}, \phi)\} = 0 \quad (18)$$

Note that:

$$\mathcal{E}_r(\tilde{H}, \mathcal{A}, \mathcal{B}) = \min_{\mathcal{D} \subseteq \mathcal{A}} \max_{\rho \in [0,1]} \rho\left(\log\left|I + \frac{1}{1+\rho}\tilde{H}_{\mathcal{D}}^\dagger(I + \tilde{H}_{\mathcal{B}}\tilde{H}_{\mathcal{B}}^\dagger)^{-1}\tilde{H}_{\mathcal{D}}\right| - \sum_{j \in \mathcal{D}} R_j\right), \quad (19)$$

$$\mathcal{E}_r(\tilde{H}, \mathcal{A}, \phi) = \min_{\mathcal{D} \subseteq \mathcal{B}} \max_{\rho \in [0,1]} \rho\left(\log\left|I + \frac{1}{1+\rho}\tilde{H}_{\mathcal{D}}^\dagger\tilde{H}_{\mathcal{D}}\right| - \sum_{j \in \mathcal{D}} R_j\right),$$

$$\mathcal{E}_r(\tilde{H}, \mathcal{A} \cup \mathcal{B}, \phi) = \min_{\mathcal{D} \subseteq \mathcal{A} \cup \mathcal{B}} \max_{\rho \in [0,1]} \rho\left(\log\left|I + \frac{1}{1+\rho}\tilde{H}_{\mathcal{D}}^\dagger\tilde{H}_{\mathcal{D}}\right| - \sum_{j \in \mathcal{D}} R_j\right).$$

Next for any $\mathcal{D} \subseteq \mathcal{A}$ $$\log\left|I + \tilde{H}_{\mathcal{D}}^\dagger\tilde{H}_{\mathcal{D}}\right| - \sum_{k \in \mathcal{D}} R_k \leq 0 \Rightarrow \quad (20)$$

$$\log\left|I + \tilde{H}_{\mathcal{D}}^\dagger(I + \tilde{H}_{\mathcal{B}}\tilde{H}_{\mathcal{B}}^\dagger)^{-1}\tilde{H}_{\mathcal{D}}\right| - \sum_{k \in \mathcal{D}} R_k \leq 0,$$

whereas for any $\mathcal{D} \subseteq \mathcal{A} \cup \mathcal{B}$ such that $\mathcal{D} \cap \mathcal{A}$ and $\mathcal{D} \cap \mathcal{B}$ are both non-empty, using the chain-rule for mutual information, we have that:

$$\log\left|I + \tilde{H}_{\mathcal{D}}^\dagger\tilde{H}_{\mathcal{D}}\right| = \log\left|I + \tilde{H}_{\mathcal{D} \cap \mathcal{B}}^\dagger\tilde{H}_{\mathcal{D} \cap \mathcal{B}}\right| + \quad (21)$$

$$\log\left|I + \tilde{H}_{\mathcal{D} \cap \mathcal{A}}^\dagger(I + \tilde{H}_{\mathcal{D} \cap \mathcal{B}}\tilde{H}_{\mathcal{D} \cap \mathcal{B}}^\dagger)^{-1}\tilde{H}_{\mathcal{D} \cap \mathcal{A}}\right|,$$

-continued so that $$\left\{\log\left|I + \tilde{H}_{\mathcal{D}}^\dagger\tilde{H}_{\mathcal{D}}\right| - \sum_{k \in \mathcal{D}} R_k \leq 0\right\} \Rightarrow$$

$$\left\{\left\{\log\left|I + \tilde{H}_{\mathcal{D} \cap \mathcal{B}}^\dagger\tilde{H}_{\mathcal{D} \cap \mathcal{B}}\right| - \sum_{k \in \mathcal{D}_\mathcal{B}} R_k \leq 0\right\} \cup \right.$$

$$\left.\left\{\log\left|I + \tilde{H}_{\mathcal{D} \cap \mathcal{A}}^\dagger(I + \tilde{H}_{\mathcal{B}}\tilde{H}_{\mathcal{B}}^\dagger)^{-1}\tilde{H}_{\mathcal{D} \cap \mathcal{A}}\right| - \sum_{k \in \mathcal{D} \cap \mathcal{A}} R_k \leq 0\right\}\right\}$$

Using (21) and (20) with (11) and (19), we see that (18) must be true. Thus, we have that:

$$\mathcal{E}_r\left(\tilde{H}, \bigcup_{j=1}^p \mathcal{G}_j, \phi\right) = 0 \quad (22)$$

$$\Rightarrow \min\left\{\mathcal{E}_r\left(\tilde{H}, \mathcal{G}_1, \bigcup_{j=2}^p \mathcal{G}_j\right), \mathcal{E}_r\left(\tilde{H}, \bigcup_{j=2}^p \mathcal{G}_j, \phi\right)\right\} = 0$$

$$\Rightarrow \min\left\{\mathcal{E}_r\left(\tilde{H}, \mathcal{G}_1, \bigcup_{j=2}^p \mathcal{G}_j\right), \mathcal{E}_r\left(\tilde{H}, \bigcup_{j=3}^p \mathcal{G}_j\right)\mathcal{E}_r\left(\tilde{H}, \bigcup_{j=3}^p \mathcal{G}_j, \phi\right)\right\} = 0$$

$$\Rightarrow \vdots$$

$$\Rightarrow \mathcal{E}_r(\tilde{H}, \underline{\mathcal{G}}) = 0$$

For completeness, letting $\mathcal{E}$ and $\{\mathcal{E}_k\}_{k=1}^K$ denote the joint and per-user error events, respectively, we have the following which states that the outage probabilities defined for any SGD (optimal or otherwise) are simultaneously achievable without making any perfect feedback assumption. The latter fact is crucial since for any partition, the outage events were themselves defined (in (4) and (5)) after assuming perfect feedback from preceding groups.

Theorem 1: For any $\in > 0$, a set of per-user block (codeword) error probabilities, $\{\Pr(\mathcal{E}_k)\}$, satisfying $\Pr(\mathcal{E}_k) \leq \Pr(\mathcal{O}_k) + \in$, $1 \leq k \leq K$ along with a joint error probability $\Pr(\mathcal{E}) \leq \Pr(\mathcal{O}) + \in$ are simultaneously achievable for a sufficiently long block-length.

The proof of Theorem 1 is provided in Appendix 1.

3 Optimal Successive Group Decoder (OSGD)

An exemplary greedy algorithm which determines the optimal grouping function includes the following steps:

1. Initialize: $\mathcal{S} = \{1, \ldots, K\}$ and $\underline{\mathcal{G}}_{opt} = \phi$.
2. Among all ordered partitions of $\mathcal{S}$ into two groups $\{\{\mathcal{G}, \mathcal{S} \backslash \mathcal{G}\}\}$ with $f(\mathcal{G}) = 1$ and $\mathcal{G} \neq \phi$, select $\{\mathcal{G}^*, \mathcal{S} \backslash \mathcal{G}^*\}$ having the highest value of the metric $\mathcal{E}_r(\tilde{H}, \mathcal{G}, \mathcal{S} \backslash \mathcal{G})$.
3. Update $\mathcal{S} = \mathcal{S} \backslash \mathcal{G}^*$ and $\underline{\mathcal{G}}_{opt} = \{\underline{\mathcal{G}}_{opt}, \mathcal{G}^*\}$.
4. If $\mathcal{S} = \phi$ then stop, else go to Step 2.

An SGD which employs the ordered partition determined by the above greedy algorithm, will be referred to herein as an optimal SGD (OSGD). Note that when the bounding function $f(.)$ is the maximum group size constraint with $\mu_{max} = 1$, the optimal grouping algorithm reduces to the optimal ordering algorithm. Further, if all user rates are also equal, it can be verified that the exemplary optimal grouping algorithm becomes identical to the optimal V-BLAST ordering. (See P. W. Wolniansky et al., "V-BLAST: An architecture for realizing very high data rates over the rich-scattering wireless channel," in *Proc. of the ISSSE*, Pisa, Italy, September 1998; and B. Hassibi, "An efficient square-root algorithm for BLAST,"

submitted to IEEE *Trans. Signal Processing.*, January 2000.) Thus the optimality properties that are proven herein for the general case, also bring out several hitherto unrecognized optimalities of the V-BLAST ordering.

Techniques similar to those used for V-BLAST ordering can result in considerable computational savings in implementing the exemplary greedy algorithm. (See, e.g., B. Hassibi, "An efficient square-root algorithm for BLAST," submitted to *IEEE Trans. Signal Processing.*, January 2000.) For a given group size constraint $\mu_{max}$, since at each stage the number of partitions examined is upper bounded by $\mathcal{O}(K^{\mu_{max}})$ and since there can be at-most K stages, the total number of partitions examined is upper bounded by $\mathcal{O}(K^{\mu_{max}+1})$.

3.1 Optimalities of OSGD

For the given realization $\tilde{H}$, let $\mathcal{G}_{opt} = \{\mathcal{G}_1^*, \ldots, \mathcal{G}_p^*\}$ be the ordered partition yielded by the greedy algorithm. We offer the following theorem.

Theorem 2: The greedy algorithm determines the ordered partition that maximizes the error exponent among all valid ordered partitions $$\mathcal{G}_{opt} = \arg\max_{\mathcal{G} \in \mathcal{Q}} \{\varepsilon_r(\tilde{H}, \mathcal{G})\} \tag{23}$$

The proof of Theorem 2 is given in Appendix 2. Theorem 2 also leads to the following theorem.

Theorem 3: The OSGD minimizes the common outage probability over all SGDs.

To prove Theorem 3, suppose for the given realization $\tilde{H}$, $\varepsilon_r(\tilde{H}, \mathcal{G}_{opt}) = 0$. From Theorem 2, for any valid ordered partition $\mathcal{G}(\mathcal{G}_1, \ldots, \mathcal{G}_p) \in \mathcal{Q}$, $\varepsilon_r(\tilde{H}, \mathcal{G}) = 0$. Thus, if the SGD declares a common outage for the ordered partition $\mathcal{G}_{opt}$, it will declare a common outage for every other valid ordered partition.

A consequence of Theorem 3 is that the unconstrained OSGD for which all ordered partitions are valid yields the minimum common outage probability. According to Lemma 3, however, the ML decoder minimizes the common outage probability. It can thus be concluded that the common outage probabilities of the unconstrained OSGD and the ML decoder are identical and the minimum possible.

For a given channel $\tilde{H}$ and bounding function $f(.)$, a subset $\mathcal{U}_{opt} \subseteq \{1, \ldots, K\}$ is defined to be the optimal undecodable set, if $\forall \mathcal{L} \subseteq \mathcal{U}_{opt}, \mathcal{L} \neq \phi$ such that $f(\mathcal{L}) = 1$, $\varepsilon_r(\tilde{H}, \mathcal{L}, \mathcal{U}_{opt} \setminus \mathcal{L}) = 0$, and there exists an ordered partition $\{\mathcal{G}_1, \ldots, \mathcal{G}_k\}$ satisfying $$\bigcup_{q=1}^{k} \mathcal{G}_q = \mathcal{U}_{opt}^c = \{1 \ldots, K\} \setminus \mathcal{U}_{opt}, \text{ and} \tag{24}$$

$$\min_{1 \leq q \leq k} \left\{ \varepsilon_r\left(\tilde{H}, \mathcal{G}_q, \left(\bigcup_{m=q+1}^{k} \mathcal{G}_m\right) \cup \mathcal{U}_{opt}\right) \right\} > 0$$

The set $\mathcal{U}_{opt}^c$ which is the complement of $\mathcal{U}_{opt}$, is referred to as the optimal decodable set.

Theorem 4: For a given channel $\tilde{H}$ and bounding function $f(.)$, the optimal undecodable set is unique.

The proof of Theorem 4 is as follows. Suppose $\mathcal{U}$ and $\mathcal{K}$ are two optimal undecodable subsets in $\mathcal{S}$ such that $\mathcal{U} \neq \mathcal{K}$. Then by definition, there exits an ordered partition $\{\mathcal{G}_1, \ldots, \mathcal{G}_k\}$ of $\mathcal{K}^c$ satisfying $$\min_{1 \leq q \leq k} \left\{ \varepsilon_r\left(\tilde{H}, \mathcal{G}_q, \left(\bigcup_{m=q+1}^{k} \mathcal{G}_m\right) \cup \mathcal{K}\right) \right\} > 0 \tag{25}$$

Let $\mathcal{G}_i$ be the first group for which $\mathcal{G}_i \cap \mathcal{U} \neq \phi$. Then from (25) and Lemma 2:

$$\varepsilon_r(\tilde{H}, \mathcal{G}_i \cap \mathcal{U}, [\cup_{m=i+1}^{k} \mathcal{G}_m) \cup \mathcal{K}] \cap \mathcal{U}) > 0 \tag{26}$$

Since $\mathcal{U} \subset (\cup_{m=i}^{k} \mathcal{G}_m) \cup \mathcal{K}$, (26) is a contradiction because $\mathcal{U}$ is an optimal undecodable set.

Thus from Theorem 4, it can be inferred that for a given $\tilde{H}$ and any valid ordered partition $\mathcal{G} \in \mathcal{Q}$, individual outages will at least be declared for all users in the unique optimal undecodable set $\mathcal{U}_{opt}$. In fact letting $\mathcal{U}(\mathcal{G})$ denote the undecodable set corresponding to the partition $\mathcal{G}$, we have that $\mathcal{U}_{opt} = \cap_{\mathcal{G} \subseteq \mathcal{Q}} \mathcal{U}(\mathcal{G})$. Hence the optimal ordered partition is one which ensures that no outage is declared for any user in the (unique) decodable set $\mathcal{U}_{opt}^c$ and all of them are decoded by the SGD. This insight leads to the following theorem.

Theorem 5: The OSGD simultaneously minimizes the individual outage probabilities of all users.

To prove Theorem 5, in the ordered partition returned by the greedy algorithm, $\mathcal{G}_{opt} = \{\mathcal{G}_1^*, \ldots, \mathcal{G}_p^*\}$, let $\mathcal{G}_{k+1}^*$ be the first group in outage, i.e., the first group with $\varepsilon_r(\tilde{H}, \mathcal{G}_{k+1}^*, \cup_{m=k+2}^{p} \mathcal{G}_m^*) = 0$. From the construction of the greedy algorithm, it can be verified that for all non-empty subsets $\mathcal{A} \subseteq \cup_{m=k+1}^{p} \mathcal{G}_m^*$, with $f(\mathcal{A}) = 1$, $$\varepsilon_r(\tilde{H}, \mathcal{A}, \cup_{m=k+1}^{p} \mathcal{G}_m^* \setminus \mathcal{A}) = 0, \tag{27}$$

which implies that $\cup_{m=k+1}^{p} \mathcal{G}_m^*$ is the unique optimal undecodable set $\mathcal{U}_{opt}$. Thus in the partition $\mathcal{G}_{opt}$ an outage is declared for user k (or equivalently the event $\mathcal{O}_k$ is true) if and only if $k \in \mathcal{U}_{opt}$. Moreover, since $k \in \mathcal{U}_{opt}$ implies that $\mathcal{O}_k$ is true for each partition in $\mathcal{Q}$, we can conclude that the OSGD simultaneously minimizes the individual outage probabilities of all users over all valid SGDs.

Note that if there is no group in outage, the optimal undecodable set is the empty set. Thus the greedy algorithm always partitions the set of users into a decodable set $\mathcal{U}_{opt}^c \cup_{q=1}^{k} \mathcal{G}_q^*$ and and an optimal undecodable set $\mathcal{U}_{opt} = \cup_{q=k+1}^{p} \mathcal{G}_q^*$, where $\mathcal{G}_{opt} = \{\mathcal{G}_1^*, \ldots, \mathcal{G}_p^*\}$ for some $1 \leq k \leq p^*$. In fact, if the set $\mathcal{U}_{opt}$ was known beforehand and the greedy algorithm were run on $\mathcal{U}_{opt}^c$ by treating users in $\mathcal{U}_{opt}$ as Gaussian interferers, the resulting ordered partition would be $\{\mathcal{G}_1^*, \ldots, \mathcal{G}_k^*\}$. To see this let $\{\mathcal{G}_1, \ldots, \mathcal{G}_q\}$ be the ordered partition of $\mathcal{U}_{opt}^c$ resulting from the latter greedy algorithm. Recall that since $\mathcal{U}_{opt}$ is the optimal undecodable set, $$\max_{\substack{\mathcal{G} \subseteq \{1, \ldots, K\} \\ f(\mathcal{G}) = 1, \mathcal{G} \cap \mathcal{U}_{opt} \neq \phi}} \varepsilon_r(\tilde{H}, \mathcal{G}, \mathcal{G}^c) = 0, \tag{28}$$

which using the fact that $$\max_{\substack{\mathcal{G} \subseteq \{1, \ldots, K\} \\ f(\mathcal{G}) = 1}} \varepsilon_r(\tilde{H}, \mathcal{G}, \mathcal{G}^c) = \tag{29}$$

-continued $$\max\left\{\max_{\substack{\mathcal{G}\subseteq\{1,\ldots,K\}\\f(\mathcal{G})=1,\mathcal{G}\cap\mathcal{U}_{opt}\neq\phi}}\varepsilon_r(\tilde{H},\mathcal{G},\mathcal{G}^c),\max_{\substack{\mathcal{G}\subseteq\mathcal{U}_{opt}^c\\f(\mathcal{G})=1}}\varepsilon_r(\tilde{H},\mathcal{G},\mathcal{G}^c)\right\} \quad 5$$

leads to $$\hat{\mathcal{G}}_1 = \arg\max_{\substack{\mathcal{G}\subseteq\mathcal{U}_{opt}^c\\f(\mathcal{G})=1}}\varepsilon_r(\tilde{H},\mathcal{G},\mathcal{G}^c) = \mathcal{G}_1^* = \arg\max_{\substack{\mathcal{G}\subseteq\{1,\ldots,K\}\\f(\mathcal{G})=1}}\varepsilon_r(\tilde{H},\mathcal{G},\mathcal{G}^c) \quad (30)$$

Similarly, it follows that q=k and $\mathcal{G}_j = \mathcal{G}_j^*$, $2 \leq j \leq q=k$. This fact along with Theorem 2 results in the following theorem.

Theorem 6: The greedy algorithm determines the ordered partition that also maximizes the error exponent for the decodable set $\mathcal{U}_{opt}^c$ over all its valid ordered partitions.

3.2 OSGD Achieves Minimum Outage Probabilities

We now examine if a better (i.e., smaller) set of achievable outage probabilities than those derived for the OSGD, can be obtained under the specified bounding function. We first consider the unconstrained OSGD and then focus on the constrained case.

An important property of the unique optimal undecodable set $\mathcal{U}_{opt}$ that will be used, is stated in the following lemma.

Lemma 4: For all valid non-empty subsets $\mathcal{G} \subseteq \mathcal{U}_{opt}$:

$$\log\left|I + \tilde{H}_\mathcal{G}^\dagger(I + \tilde{H}_{\mathcal{U}_{opt}\backslash\mathcal{G}}\tilde{H}_{\mathcal{U}_{opt}\backslash\mathcal{G}}^\dagger)^{-1}\tilde{H}_\mathcal{G}\right| < \sum_{k\in\mathcal{G}}R_k \quad (31)$$

To prove Lemma 4, consider any valid subset $\mathcal{G} \subseteq \mathcal{U}_{opt}$. Since $\mathcal{U}_{opt}$ is optimally undecodable, $\exists \mathcal{A} \subseteq \mathcal{G}$ such that $$\log\left|I + \tilde{H}_\mathcal{A}^\dagger(I + \tilde{H}_{\mathcal{U}_{opt}\backslash\mathcal{G}}\tilde{H}_{\mathcal{U}_{opt}\backslash\mathcal{G}}^\dagger)^{-1}\tilde{H}_\mathcal{A}\right| < \sum_{k\in\mathcal{A}}R_k.$$

This follows from the fact that $R_\mathcal{G} \notin \mathcal{C}(\tilde{H}, \mathcal{G}, \mathcal{U}_{opt}\backslash\mathcal{G})$. Moreover since $\mathcal{G}\backslash\mathcal{A} \subseteq \mathcal{U}_{opt}$, $R_{\mathcal{G}\backslash\mathcal{A}} \notin \mathcal{C}(\tilde{H}, \mathcal{G}\backslash\mathcal{A}, \mathcal{U}_{opt}\backslash[\mathcal{G}\backslash\mathcal{A}])$ so that $\exists \mathcal{B} \subseteq \mathcal{G}\backslash\mathcal{A}$ such that $$\log\left|I + \tilde{H}_\mathcal{B}^\dagger(I + \tilde{H}_{\mathcal{U}_{opt}\backslash\mathcal{G}}\tilde{H}_{\mathcal{U}_{opt}\backslash\mathcal{G}}^\dagger + \tilde{H}_\mathcal{A}\tilde{H}_\mathcal{A}^\dagger)^{-1}\tilde{H}_\mathcal{B}\right| < \sum_{k\in\mathcal{B}}R_k.$$

Combining these two observations yields the following:

$$\log\left|I + \tilde{H}_\mathcal{A}^\dagger(I + \tilde{H}_{\mathcal{U}_{opt}\backslash\mathcal{G}}\tilde{H}_{\mathcal{U}_{opt}\backslash\mathcal{G}}^\dagger)^{-1}\tilde{H}_\mathcal{A}\right| + \quad (32)$$

$$\log\left|I + \tilde{H}_\mathcal{B}^\dagger(I + \tilde{H}_{\mathcal{U}_{opt}\backslash\mathcal{G}}\tilde{H}_{\mathcal{U}_{opt}\backslash\mathcal{G}}^\dagger + \tilde{H}_\mathcal{A}\tilde{H}_\mathcal{A}^\dagger)^{-1}\tilde{H}_\mathcal{B}\right| \stackrel{(a)}{=}$$

$$\log\left|I + \tilde{H}_{\mathcal{A}\cup\mathcal{B}}^\dagger(I + \tilde{H}_{\mathcal{U}_{opt}\backslash\mathcal{G}}\tilde{H}_{\mathcal{U}_{opt}\backslash\mathcal{G}}^\dagger)^{-1}\tilde{H}_{\mathcal{A}\cup\mathcal{B}}\right| < \sum_{k\in\mathcal{A}\cup\mathcal{B}}R_k$$

where (a) follows from the chain rule for mutual information and the fact that $\mathcal{A}$ and $\mathcal{B}$ are disjoint subsets of $\mathcal{G}$. Continuing the argument with $\tilde{\mathcal{A}} = \mathcal{A} \cup \mathcal{B}$, we see that since the valid subset $\mathcal{G}\backslash\tilde{\mathcal{A}} \subseteq \mathcal{U}_{opt}$, we must have that $\exists \tilde{\mathcal{B}} \subseteq \mathcal{G}\backslash\tilde{\mathcal{A}}$ such that $$\log\left|I + \tilde{H}_{\tilde{\mathcal{B}}}^\dagger(I + \tilde{H}_{\mathcal{U}_{opt}\backslash\mathcal{G}}\tilde{H}_{\mathcal{U}_{opt}\backslash\mathcal{G}}^\dagger + \tilde{H}_{\tilde{\mathcal{A}}}\tilde{H}_{\tilde{\mathcal{A}}}^\dagger)^{-1}\tilde{H}_{\tilde{\mathcal{B}}}\right| < \sum_{k\in\tilde{\mathcal{B}}}R_k.$$

Combining this with (32) and proceeding so on, the lemma can be proven.

Let us first consider the unconstrained OSGD (where all ordered partitions are valid). The common outage event for this decoder is identical to that defined here for a ML decoder. Given this event, a joint error event (where at least one user is decoded in error) is very likely, so the common outage event definition is well justified and the resulting common outage probability, $\Pr(\mathcal{O})$, is hard to improve upon. Next, let us look at the individual outage probabilities. Let $\mathcal{U}_{opt}$ denote the unique undecodable set for the unconstrained OSGD. Invoking Lemma 4 we have that $$\log\left|I + \tilde{H}_{\mathcal{U}_{opt}}^\dagger \tilde{H}_{\mathcal{U}_{opt}}\right| < \sum_{k\in\mathcal{U}_{opt}}R_k.$$

From the discussion in R. G. Gallager, "A perspective on multiaccess channels," IEEE Trans. Inform. Theory, vol. 31, pp. 124-142, March 1985, we can conclude that if we attempted to decode all users in $\mathcal{U}_{opt}$, jointly (after users in $\mathcal{U}_{opt}^c$ have been perfectly canceled) a type-$\mathcal{U}_{opt}$ error—where an error occurs for each user in $\mathcal{U}_{opt}$—is very likely. Hence, declaring individual outages for this set of users is well justified and obtaining a simultaneously achievable set of individual outage probabilities lower than those derived here, seems intractable.

Next, consider the constrained OSGD and again since the common outage probability is well motivated, we focus on the individual outage probabilities. Suppose $(\mathcal{G}_1, \ldots, \mathcal{G}_q)$ is some valid ordered partition of the unique undecodable set $\mathcal{U}_{opt}$ for a given channel realization and the preceding users in $\mathcal{U}_{opt}^c$ have been perfectly cancelled. If we attempt to decode $\mathcal{G}_1$ after treating the remaining users as Gaussian interferers, from Lemma 4 we can conclude that with high probability, an error occurs for each user in $\mathcal{G}_1$. We could still proceed to decode $\mathcal{G}_2$ without subtracting $\mathcal{G}_1$ and treating $\{\mathcal{G}_1, \mathcal{G}_3, \ldots, \mathcal{G}_q\}$ as Gaussian interferers. Lemma 4, however, indicates that errors would be very likely for all users in $\mathcal{G}_2$. Thus, there is little chance of decoding even one user, in the first group decoded, correctly. Under this fact and in the absence of a precise modeling of feedback errors (which seems intractable), declaring individual outages for all users in $\mathcal{U}_{opt}$ is well justified and the resulting individual outage probabilities obtained with the exemplary OSGD are the best achievable.

3.3 Adaptive SGD

Two exemplary adaptive greedy grouping algorithms will now be described where the bounding function is channel dependent. For convenience, it is assumed that the bounding function corresponds to the maximum group size constraint. Let $\mathcal{U}_{opt}(\tilde{H},\mu_{max})$ denote the optimal undecodable set yielded by the greedy algorithm for channel realization $\tilde{H}$ and maximum group size $\mu_{max}$. Our objective is to achieve the same outage probabilities as those of the OSGD with $\mu_{max}=u$ (for some specified u) but with the smallest maximum group size possible. To do so, we leverage the uniqueness of the optimal undecodable set for a given group size. Note that for each realization the minimum group size needed for outage optimality is $$\mu^* = \min\{k : k \leq u \text{ and } \mathcal{U}_{opt}(\tilde{H},k) = \mathcal{U}_{opt}(\tilde{H},u)\} \quad (33)$$

In either of the two adaptive algorithms discussed below, a valid ordered partition having at least one group of size $\mu^*$ in (33) is chosen.

In the first exemplary adaptive grouping algorithm, the exemplary greedy algorithm described above is initiated with group size one. Every time an outage is encountered, processing starts anew, i.e., processing of all users starts again after incrementing the current group size by 1. This approach yields the optimal ordered partition corresponding to group size $\mu^*$ without having to pre-compute $\mu^*$. It thus allows achieving the minimum possible outage probabilities and the maximum error exponent among all ordered partitions valid for $1 \leq \mu_{max} \leq \mu^*$. There is, however, a potential loss in the error exponent of the decodable set compared to that yielded by the optimal ordered partition with $\mu_{max}=u$, but a substantial reduction in decoding complexity makes up for it.

The second exemplary adaptive grouping algorithm also retains the outage optimality of the previously described greedy algorithm. At each stage, the algorithm picks the smallest group size from the set $\{1, \ldots, u\}$ that can avoid outage. In other words, at each step starting from group size 1, the algorithm determines if the best group (in terms of error exponent) of the current group size can avoid outage. If yes, that group is selected and the algorithm proceeds to the remaining users and resets the initial group size to one. Otherwise, the current group size is incremented by one and the process is repeated. The computational cost of determining the ordered partition for this adaptive grouping algorithm is in general less than that of the first adaptive grouping algorithm but its error exponent is also poorer.

3.4 Alternative Metrics for the Greedy Algorithm

We now present two other metrics that can be used instead of the error exponent metric in the greedy algorithm to obtain a valid ordered partition for each channel realization. Both metrics are simpler to compute and as shown below, the SGDs employing the resulting partitions also minimize the common as well as the individual outage probabilities. However, these metrics do not provide an additional optimality yielded by the error exponent metric.

For any two disjoint subsets $\mathcal{A}$ and $\mathcal{B}$ of $\{1, \ldots, K\}$ and a given channel realization $\tilde{H}$, we define $$C_1(\tilde{H}, \mathcal{A}, \mathcal{B}) \triangleq \min_{\mathcal{D} \subseteq \mathcal{A}} \left\{ \left[ \log \left| I + \tilde{H}_{\mathcal{D}}^\dagger (I + \tilde{H}_{\mathcal{B}} \tilde{H}_{\mathcal{B}}^\dagger)^{-1} \tilde{H}_{\mathcal{D}} \right| - \sum_{j \in \mathcal{D}} R_j \right]^+ \right\} \quad (34)$$

and $$C_2(\tilde{H}, \mathcal{A}, \mathcal{B}) \triangleq \min_{\mathcal{D} \subseteq \mathcal{A}} \left\{ \left[ \log \left| I + \tilde{H}_{\mathcal{D}}^\dagger (I + \tilde{H}_{\mathcal{B}} \tilde{H}_{\mathcal{B}}^\dagger)^{-1} \tilde{H}_{\mathcal{D}} \right| / \left( \sum_{j \in \mathcal{D}} R_j \right) \right]^+ \right\} \quad (35)$$

respectively, where $(x)^+ \triangleq \max\{0,x\}$ and $[x]^+ \triangleq \min\{1,x\}$. Note that $$\mathcal{E}_r(\tilde{H}, \mathcal{A}, \mathcal{B}) = 0 \Leftrightarrow C_1(\tilde{H}, \mathcal{A}, \mathcal{B}) = 0 \Leftrightarrow C_2(\tilde{H}, \mathcal{A}, \mathcal{B}) = 1 \quad (36)$$

Next, analogous to (16), for any valid ordered partition $\mathcal{G} = (\mathcal{G}_1, \ldots, \mathcal{G}_p) \in \mathcal{Q}$, we define:

$$C_1(\tilde{H}, \mathcal{G}) \triangleq \min_{1 \leq k \leq p} \left\{ C_1\left(\tilde{H}, \mathcal{G}_k, \bigcup_{j=k+1}^{p} \mathcal{G}_j\right) \right\}, \quad (37)$$

and $$C_2(\tilde{H}, \mathcal{G}) \triangleq \min_{1 \leq k \leq p} \left\{ C_2\left(\tilde{H}, \mathcal{G}_k, \bigcup_{j=k+1}^{p} \mathcal{G}_j\right) \right\}. \quad (38)$$

Note that a common outage is declared for the ordered partition $\mathcal{G}$ if and only if $C_1(\tilde{H}, \mathcal{G})=0$ and if and only if $C_2(\tilde{H}, \mathcal{G})=1$.

Using the arguments made to prove Theorem 2, it follows that employing $C_1(\tilde{H}, \mathcal{A}, \mathcal{B})$ and $C_2(\tilde{H}, \mathcal{A}, \mathcal{B})$ as the cost metrics in the greedy algorithm, respectively, will yield arg $$\max_{\mathcal{G} \in \mathcal{Q}} \{C_1(\tilde{H}, \mathcal{G})\} \text{ and } \underset{\mathcal{G} \in \mathcal{Q}}{\operatorname{argmax}} \{C_2(\tilde{H}, \mathcal{G})\}$$

as the resulting partitions, respectively. Moreover, it can be verified that the (unique) undecodable sets obtained with these metrics are identical and coincide with the set $\mathcal{U}_{opt}$ obtained with the error exponent metric. As a consequence, SGDs employing the partitions yielded by these metrics simultaneously minimize the common as well as the individual outage probabilities. Thus, it is clear that multiple partitioning rules and their corresponding SGDs can be outage optimal. In fact, for any partitioning rule to be outage optimal, for all channel realizations except a set of measure zero, its undecodable set must coincide with the set $\mathcal{U}_{opt}$ obtained with the error exponent metric. The advantage of using the error-exponent metric is that the resulting OSGD also simultaneously minimizes the achievable joint and per-user error probabilities, over all the outage optimal SGDs (cf. Theorem 1). It can thus be expected that with well-designed multi-user codes, the OSGD yields error probabilities that are close to their corresponding outage probabilities even for moderate block lengths.

3.5 Simulation Results

Figure 3:
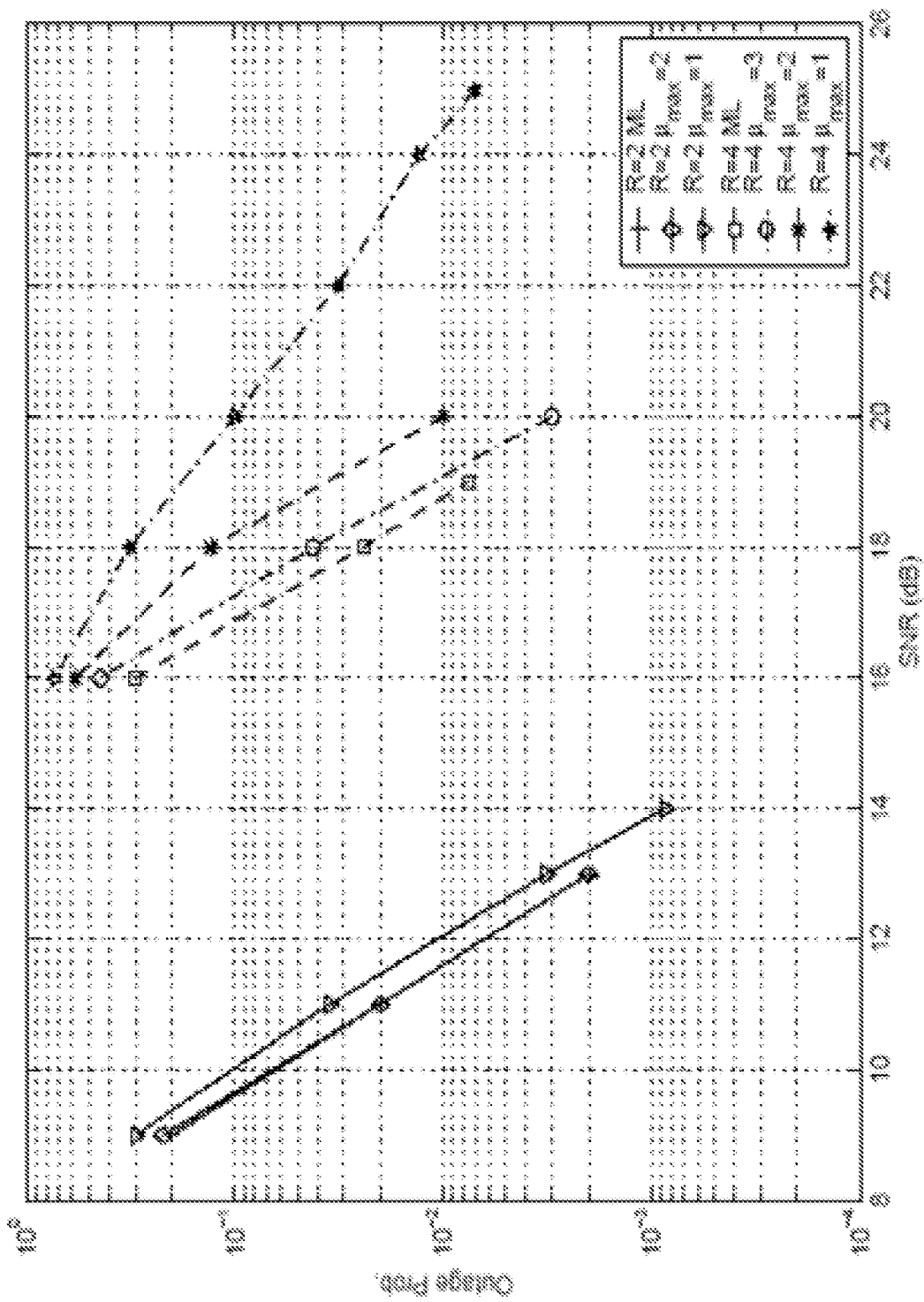
FIG. 3 is a chart of outage probability versus SNR for an ML decoder and OSGD under various rates and group sizes in an open-loop symmetric MAC with six users and a base-station with six receive antennas.

For convenience, in the following simulations we assume i.i.d. Rayleigh fading and that all users employ a single transmit antenna ($m_k=1$, $\forall k$) and transmit at the same rate with identical average powers. In FIG. 3 we consider a symmetric MAC with six users (K=6) where the base-station is equipped with six receive antennas (N=6). The first set of curves, where each user transmits with rate R=2 bits per channel use, contains the common outage probabilities of the ML decoder and two OSGDs with $\mu_{max}=1$ and $\mu_{max}=2$, respectively. Notice that even the SGD with $\mu_{max}=1$ yields a near-optimal outage probability in spite of a significantly reduced decoding complexity. The second set of curves shown in FIG. 3 contains the common outage curves for R=4.

Figure 4:
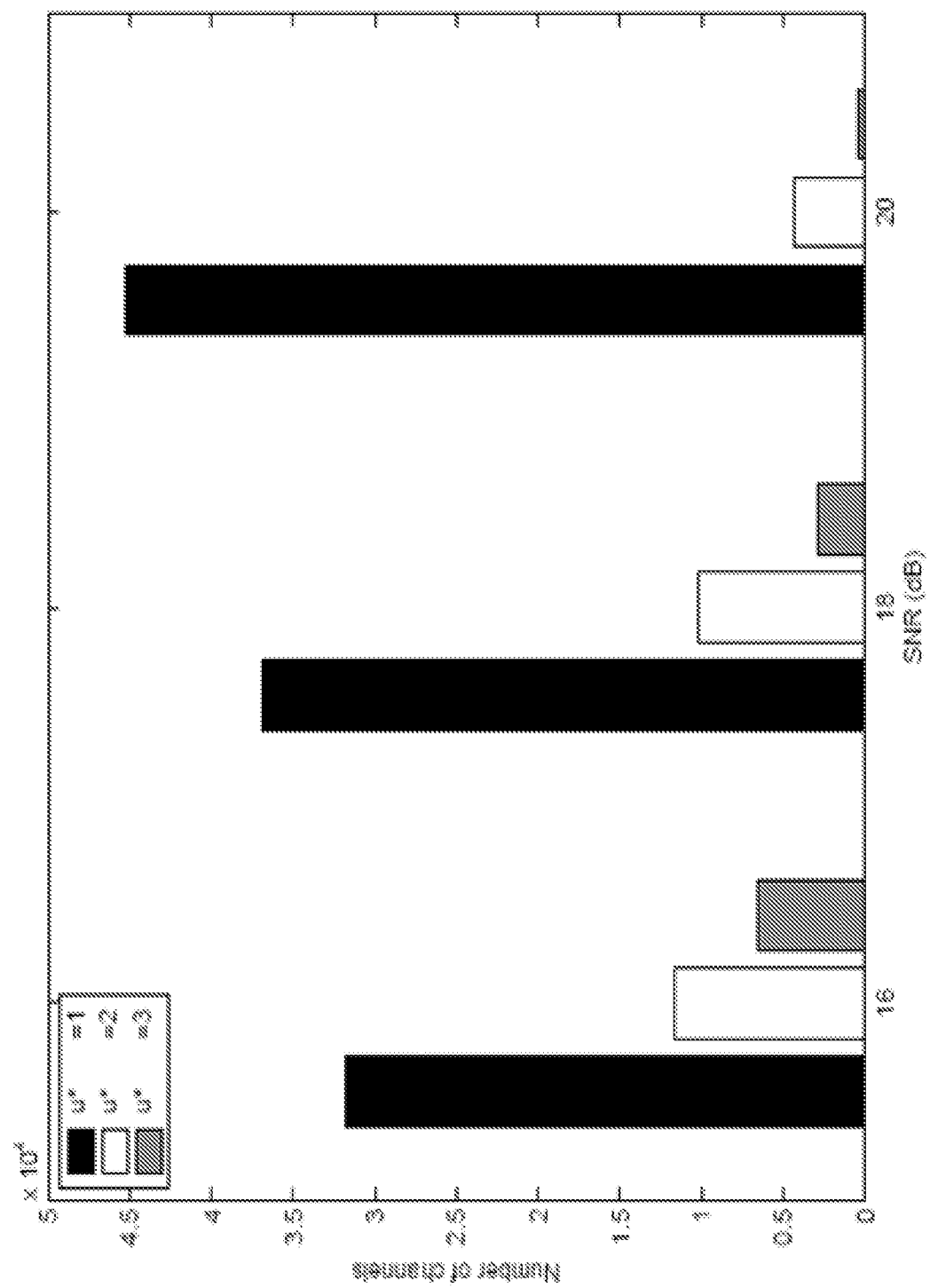
FIG. 4 illustrates the performance of an exemplary adaptive SGD (for an open-loop symmetric MAC) which adapts the maximum group size parameter (u*) based on the channel realizations and then selects the optimal partition which satisfies the maximum group size constraint, with FIG. 4 plotting the number of channel realizations for which a particular value of u* (from the set {1,2,3}) was selected.

FIG. 3 indicates that the maximum group size parameter $\mu_{max}$ can be chosen to balance the conflicting requirements of good performance and low decoding complexity. To demonstrate the complexity reduction provided by the adaptive SGD, FIG. 4 shows a bar plot in which 50,000 channel realizations are considered for each of the three SNR values. As in FIG. 3, a symmetric MAC with six users (K=6) and a base-station with six receive antennas (N=6) is assumed. At each SNR, the adaptive SGD (with u=3 in (33)) yields the same outage performance as the OSGD with $\mu_{max}=3$ and R=4 but the average group sizes needed are just 1.4570, 1.3329, and 1.0998, respectively, for the three SNR values. Moreover, it is seen that a substantial fraction of channels require just $\mu^*=1$ in (33) and rarely is $\mu^*=3$ needed.

Figure 5:
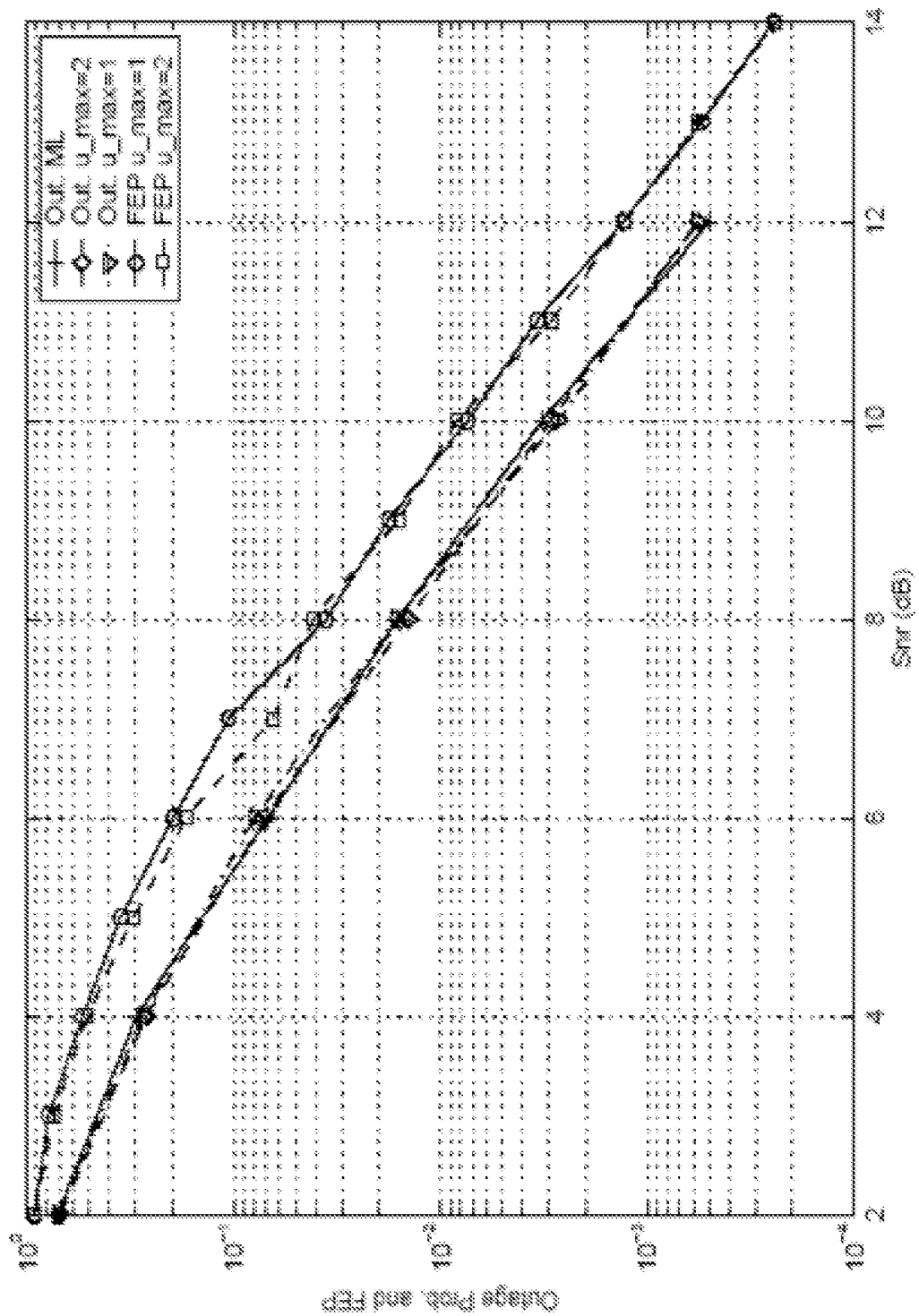
FIG. 5 is a chart of outage probability and frame error probability (FEP) versus SNR for an ML decoder and an OSGD in an open-loop symmetric MAC with four users and a base-station with four receive antennas.

In FIG. 5 we consider a symmetric MAC with $N=K=4$, $R=1$ and plot the frame error probabilities (FEPs) obtained with particular outer codes. Each user employs a (2048,1024) rate-½ IRA LDPC outer code with QPSK modulation. (See, e.g., G. Yue et al., "Optimization of Irregular Repeat Accumulate codes for MIMO systems with iterative receivers," *IEEE Trans. Wireless Commun.*, vol. 4, no. 6, pp. 2843-2855, November 2005.) The decoding is done using the OSGD with $\mu_{max}=2$ and $\mu_{max}=1$, respectively. Also plotted are their respective common outage probabilities along with that of the ML decoder. For each channel realization, the users within a group were decoded using joint detection and iterative decoding (6 iterations between decoders and detector were allowed). For larger group sizes, sphere decoder based strategies can be incorporated to reduce the complexity of the MIMO demodulation stage. (See B. M. Hochwald et al., "Achieving near-capacity on a multiple-antenna channel," *IEEE Trans. Commun.*, vol. 51, no. 3, pp. 389-399, March 2003.) As promised by the outage probability results, the optimal grouping offers considerable gains. At a FEP of $10^{-3}$ the SGD with optimal grouping and $\mu_{max}=1$ is only about 1 dB away from the best achievable FEP limit, i.e., the common outage curve of the ML decoder. Significantly, the optimal grouping is determined once at the start of each frame and only adds a small overhead since the cost of determining the optimal grouping is negligible in comparison to the complexity of decoding outer codes.

Figure 6:
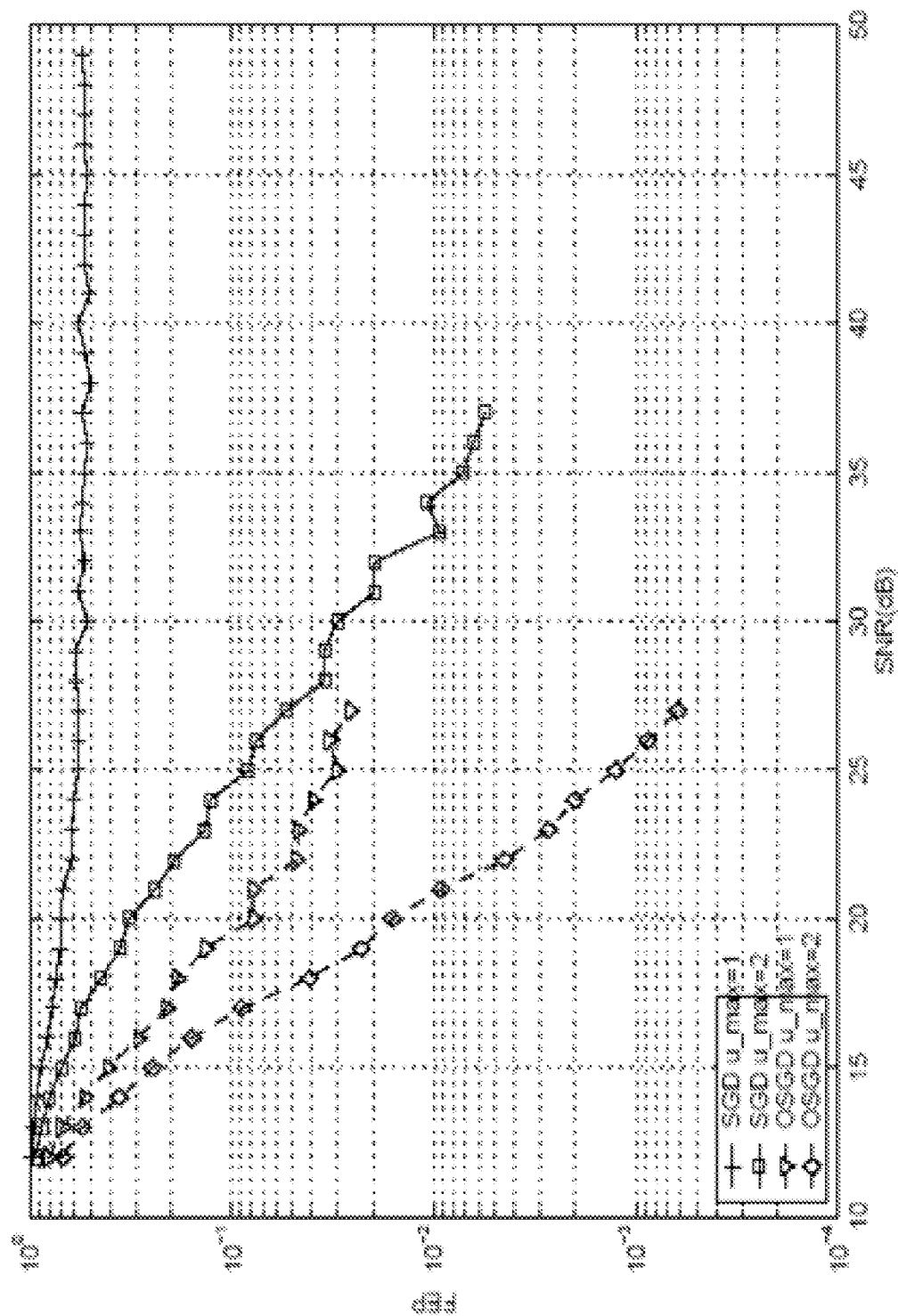
FIG. 6 is a chart of frame error probability (FEP) versus SNR for a SGD and an OSGD operating with group sizes of one and two in an open-loop symmetric MAC with four users and a base-station with four receive antennas.

The gains due to a larger group size are more pronounced for asymmetric multi-user systems with fewer receive antennas than the number of users and/or systems operating at high (sum) rates. To illustrate this point, in FIG. 6 we consider a MAC with $N=3$ receive antennas and $K=4$ users, each transmitting at rate $R=2$ bits per channel use. Each user employs a 16-QAM modulation and rate-½ IRA LDPC outer code. FIG. 6 shows the FEPs achieved by the OSGDs with $\mu_{max}=2$ and $\mu_{max}=1$, respectively. Also plotted are the FEPs achieved by SGDs with fixed partitions given by $\{\{1,2,\},\{3,4\}\}$ and $\{\{1\}, \{2\},\{3\},\{4\}\}$, respectively. Note that both the SGD with fixed groups of size 1 and the corresponding OSGD have error floors, but the OSGD (with optimal ordering in this case) provides a very large coding gain. On the other hand, the OSGD with $\mu_{max}=2$ yields a gain of about 13 dB over its fixed-order counterpart with no increase in decoding complexity.

Figure 7:
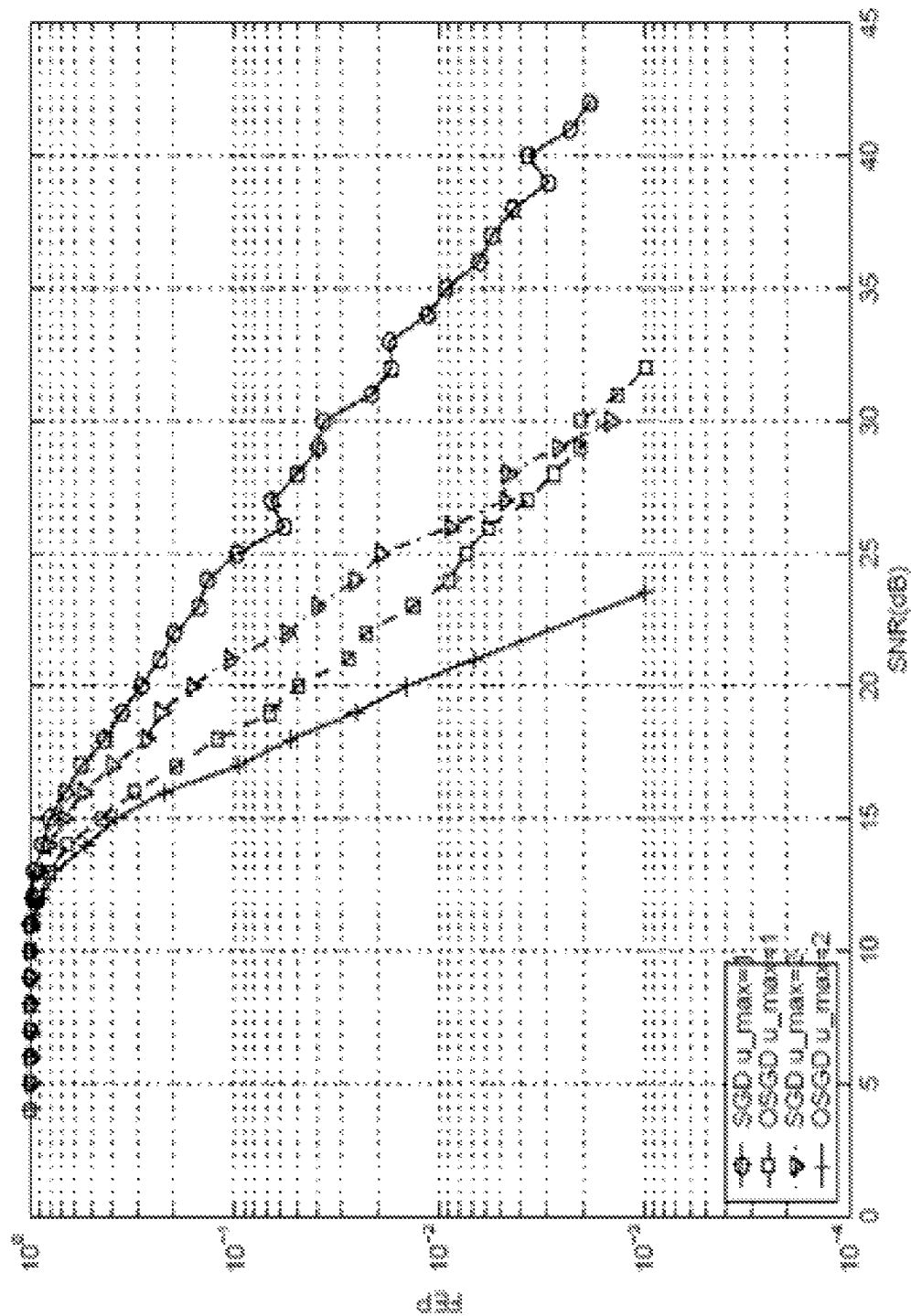
FIG. 7 is a chart of frame error probability (FEP) versus SNR for a SGD and an OSGD operating with group sizes of one and two in an open-loop symmetric MAC with four users and a base-station with four receive antennas.

In FIG. 7, we consider a MAC with $N=K=4$. Each user transmits at rate $R=3$ bits using 16-QAM modulation and $$\text{rate} - \frac{3}{4}$$

IRA LDPC outer code. FIG. 7 plots the FEPs of the OSGDs with $\mu_{max}=2$ and $\mu_{max}=1$, respectively. Also plotted are the FEPs of the SGDs with fixed partitions, with the partitions being identical to those used in the previous example. Note that a larger group size provides a considerable gain and at a FEP of $10^{-3}$, for example, the OSGD with $\mu_{max}=2$ yields a gain of about 7 dB over its counterpart with $\mu_{max}=1$.

Recall that in the present framework, the outage-optimal OSGDs are derived assuming joint-ML decoding of users within a group. In fact in the examples presented above, near-optimal point) decoding of users within a group was achieved by iterative joint MIMO detection and single user channel decoding, i.e., turbo processing. However, as will be seen in the following example, the optimal grouping rule is robust in the sense that it results in performance improvements even when no iterations are allowed between the decoders and the detector, while decoding users within a group. This aspect makes the OSGD particularly appealing for practical systems with strict complexity and delay constraints.

Figure 8:
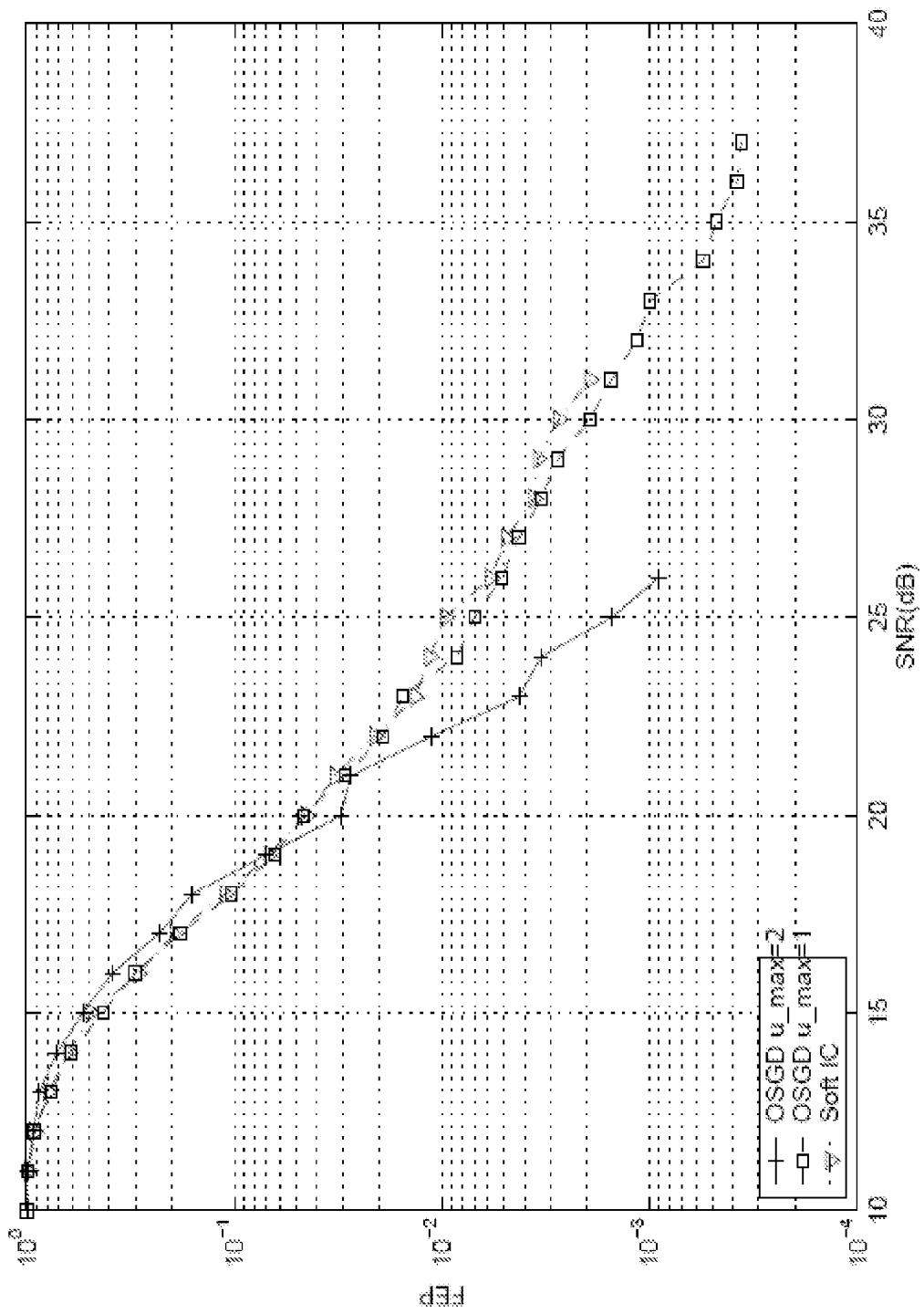
FIG. 8 is a chart of frame error probability (FEP) versus SNR for a soft interference canceller and an OSGD operating with group sizes of one and two in an open-loop symmetric MAC with four users and a base-station with four receive antennas.

FIG. 8 considers the system in the previous example (illustrated in FIG. 7) and plots the corresponding FEPs when no iteration is allowed. Also plotted is the FEP yielded by the soft interference canceller (see X. Wang et al., "Iterative (Turbo) soft interference cancellation and decoding for coded CDMA," *IEEE Trans. Commun.*, vol. 46, no. 7, pp. 1046-1061, July 1999), which, however, was allowed six decoder-detector iterations. It is seen that at a FEP of $10^{-3}$, the OSGD with $\mu_{max}=2$ yields a gain of more than 6 dB over its counterpart with $\mu_{max}=1$ as well as the soft interference canceller.

4 Asymptotic Analysis

In this section, several relevant performance metrics associated with the OSGD in the high SNR regime as well as in the large array regime are considered. For convenience, a maximum group size constraint is assumed. In particular, for any given vector of non-negative weights or priorities $\theta=[\theta_1, \ldots, \theta_K]^T$, and assuming, without loss of generality, that $$\sum_{k=1}^{K} \theta_k = 1,$$

the weighted sum common outage capacity is given by:

$$C(\theta, \varepsilon) = \sup\left\{\sum_{k=1}^{K} \theta_k R_k : Pr(O) \leq \varepsilon\right\}, \varepsilon\in(0, 1), \quad (39)$$

and the weighted sum individual outage capacity, given by:

$$CI(\theta, \varepsilon) = \sup\left\{\sum_{k=1}^{K} \theta_k R_k : Pr(O_k) \leq \varepsilon_k, 1 \leq k \leq K\right\}, \quad (40)$$

$$\varepsilon = [\varepsilon_1, \ldots, \varepsilon_K]^T \in (0, 1)^K.$$

Other metrics considered here are the symmetric common outage capacity, which is the maximum identical rate that can be simultaneously achieved for all users subject to a constraint on the common outage probability, i.e., $$C^{sym}(\mathcal{E}) = \sup\{R : Pr(\mathcal{O}) \leq \mathcal{E}\} \quad (41)$$

and the individual symmetric outage capacity $$C^{sym}(\mathcal{E}) = \sup\{R : Pr(\mathcal{O}_k) \leq \mathcal{E}, 1 \leq k \leq K\}. \quad (42)$$

The individual and common outage formulations also allow us to define the corresponding throughputs. For each outage formulation we consider two notions of throughput which are mathematically identical. The first notion of throughput is for a delay-sensitive system where the receiver simply drops all packets of users in outage. The resulting common-outage throughput is then given by $$[1 - Pr(\mathcal{O})]\sum_{k=1}^{K} R_k,$$

whereas the individual-outage throughput is given by $$\sum_{k=1}^{K} R_k[1 - Pr(\mathcal{O}_k)].$$

Next, consider a reliability-constrained system where the receiver keeps sending retransmission requests to each user in outage until it enters the non-outage state, after which the user starts transmitting a new packet. The underlying idea is that a user cannot remain in outage (i.e., experiencing deep fade) forever.

Here we focus on one such simple system where each transmitted packet experiences independent fading and due to complexity constraints the receiver uses only the current (most-recent) received signal matrix to decode all the users. For this system, we can readily extend the analysis for the MIMO point-to-point case (as described in N. Ahmed et al., "Throughput measures for delay-constrained communication systems in fading channels," Proc. Allerton Conf on Comm. Control, and Comput., October 2003) and show that the throughput obtained for user k is equal to $R_k/\mathbb{E}\{S_k\}$ where $\mathbb{E}\{S_k\}$ is the average service time for that user. Thus, the system throughput is equal to $$\sum_{k=1}^{K} R_k/\mathbb{E}\{S_k\}.$$

In the common outage formulation, $\mathbb{E}\{S_k\} = [1 - Pr(\mathcal{O})]^{-1}$, $1 \leq k \leq K$ and in the individual outage formulation, $\mathbb{E}\{S_k\} = [1 - Pr(\mathcal{O}_k)]^{-1}$, $1 \leq k \leq K$. Hence mathematically for either outage formulation, the two notions of throughput are identical. Thus, in the common outage formulation, the weighted throughput maximization problem reads $$\mathcal{T}(\theta) = \sup\left\{[1 - Pr(O)]\sum_{k=1}^{K} \theta_k R_k\right\}, \quad (43)$$

whereas in the individual outage case it becomes $$\mathcal{TI}(\theta) = \sup\left\{\sum_{k=1}^{K} \theta_k R_k[1 - Pr(O_k)]\right\}. \quad (44)$$

4.1 High SNR Asymptotes

We assume that the channel matrix of user k can be modeled as $H_k = \vartheta_k A_k H_k^w B_k$ where $H_k^w$ is an N×$m_k$ matrix with i.i.d. $\mathcal{CN}(0,1)$ elements and $A_k$, $B_k$ represent the transmit and receive correlation matrices of user k, respectively, as described in W. Rhee et al., "On the capacity of multiuser wireless channels with multiple antennas," IEEE Trans. Inform. Theory, vol. 49, no. 10, pp. 2580-2595, October 2003.

$\{\partial_k\}$ represent the set of independent shadow-fading coefficients which capture the effect of large-scale or macroscopic fading and are log-normal distributed. We take $\{Q_k = \rho \tilde{Q}_k\}_{k=1}^{K}$, where $\{\tilde{Q}_k\}$ are positive semi-definite and fixed arbitrarily and define $$\tilde{H}_{\mathcal{J}} = \left[H_k \tilde{Q}_k^{\frac{1}{2}}\right]_{k \in \mathcal{J}}$$

and let $\rho \to \infty$. Our objective here is to determine asymptotically tight affine approximations for the capacities (39)-(42). These approximations reveal the correct scaling of the corresponding capacities with SNR, are simpler to compute than their respective true capacities, and also capture the effect of relevant channel parameters such as correlations and the like. The scaling factors can be computed for the two throughputs (43) and (44). The following two lemmas (which are proved in Appendix 3) are used for this.

Lemma 5: For each $\mathcal{J} \in \mathcal{S}$, we have rank $\tilde{H}_{\mathcal{J}}) = \beta_{\mathcal{J}}$ with probability one, for some positive integer $\beta_{\mathcal{J}}$.

Letting b: $\mathcal{S} \to \mathbb{Z}_+$ be a non-negative integer valued set function such that $b(\mathcal{J}) = \beta_{\mathcal{J}}$, we have the following result.

Lemma 6: The region $$\mathcal{R}(b) \triangleq \left\{r \in \mathbb{R}_+^K : \sum_{k \in \mathcal{J}} r_k \leq b(\mathcal{J}), \forall \mathcal{J} \in \mathcal{S}\right\} \quad (45)$$

is a polymatroid with rankfunction b(.)

Thus a solution to the problem $$\max_{r \in \mathcal{R}(b)} \{\theta^T r\}, \quad (46)$$

lies on a vertex (or corner point) and can be determined as $$r_{\psi(1)}^* = b(\psi(1)), \quad (47)$$

$$r_{\psi(k)}^* = b(\{\psi(j)\}_{j=1}^{k}) - b(\{\psi(j)\}_{j=1}^{k-1}), 2 \leq k \leq K,$$

where $\psi(.)$ is any permutation such that $\theta_{\psi(1)} \geq \theta_{\psi(2)} \ldots \geq \theta_{\psi(K)}$. (See D. N. C. Tse et al. "Multiaccess fading channels-part i: Polymatroidal structure, optimal resource allocation and throughput capacities," IEEE Trans. Inform. Theory, vol. 44, no. 2, pp. 2696-2815, November 1998.)

We first consider the weighted sum common outage capacity (39) and define g($\tilde{H}_{\mathcal{J}}\tilde{H}_{\mathcal{J}}^\dagger, b(\mathcal{J})$) as the product of the $b(\mathcal{J})$ largest eigenvalues of $\tilde{H}_{\mathcal{J}}\tilde{H}_{\mathcal{J}}^\dagger$. Next, consider an ordered partition $(\mathcal{G}_1, \ldots, \mathcal{G}_p)$. For each $\mathcal{G}_k$, let $P_{\mathcal{G}_k}^\perp$ denote the orthogonal projection whose range is the orthogonal complement of range of $[\tilde{H}_{\mathcal{G}_j}]_{j=k+1}^{P}$. Then as a consequence of Lemma 5 we have that the rank of $P_{\mathcal{G}_k}^\perp \tilde{H}_{\mathcal{G}_k}$ equals some constant with probability one. Let $h(\mathcal{G}_k, \bar{\mathcal{G}}_k)$ denote this rank and note that $h(\mathcal{G}_k, \bar{\mathcal{G}}_k) = b(\mathcal{G}_k \cup \bar{\mathcal{G}}_k) - b(\bar{\mathcal{G}}_k)$. The following theorem provides an asymptotically tight affine approximation to the weighted sum common outage capacity. The proof is given in Appendix 4.

Theorem 7: An asymptotically tight affine approximation to $\mathcal{C}(\theta, \mathcal{E})$ given in (39), denoted by $\bar{\mathcal{C}}(\theta, \in)$, is of the form $$\tilde{C}(\theta, \varepsilon) = \log(\rho) \sum_{k=1}^{K} \theta_k r_k^* + O(1) \qquad (48)$$

and satisfies $$\lim_{\rho \to \infty} (C(\theta, \varepsilon) - \tilde{C}(\theta, \varepsilon)) = 0. \qquad (49)$$

For the ML decoder, the $\mathcal{O}(1)$ term in (48) is of the form $\log(\gamma_\infty^{ML}(\theta, \mathcal{E}))$, where $$\gamma_\infty^{ML}(\theta, \varepsilon) \triangleq \sup \left\{ \prod_{k=1}^{K} y_k^{\theta_k} : \right.$$

$$\left. Pr\left( \bigcup_{b(\mathcal{J}) = \sum_{k \in \mathcal{J}}^{\mathcal{J} \in S} r_k^*} \left\{ g(\tilde{H}_{\mathcal{J}} \tilde{H}_{\mathcal{J}}^{\dagger}, b(\mathcal{J})) < \prod_{k \in \mathcal{J}} y_k \right\} \right) \leq \varepsilon \right\}, \qquad (50)$$

and for the OSGD the $\mathcal{O}(1)$ term is of the form $\log(\gamma_\infty^{OSGD}(\theta, \mathcal{E}))$ where:

$$\gamma_\infty^{OSGD}(\theta, \varepsilon) \triangleq \qquad (51)$$

$$\sup \left\{ \prod_{k=1}^{K} y_k^{\theta_k} : Pr\left( \bigcap_{\mathcal{G} \in \mathcal{Q}} \left\{ \bigcup_{k=1}^{p} \left\{ \bigcup_{\substack{\mathcal{J} \subseteq \mathcal{G}_k \\ b(\mathcal{J}, \mathcal{G}_k) \leq \sum_{k \in \mathcal{J}} r_k^*}} \left\{ g\left(\tilde{H}_{\mathcal{J}}^{\dagger} P_{\mathcal{G}_k}^{\perp} \tilde{H}_{\mathcal{J}}, \sum_{k \in \mathcal{J}} r_k^* \right) < \prod_{k \in \mathcal{J}} y_k \right\} \right\} \right\} \right) \leq \varepsilon \right\},$$

Note that there can be multiple solutions $\{r_k^*\}$ to (46) all yielding the same tight affine approximation. For instance, when all of the weights $\{\theta_i\}$ are equal, i.e., all users have equal priorities, all K! corner points of the polymatroid $\mathcal{R}(b)$ are solutions. In this case, an interesting effect referred to as the antenna pooling effect is discussed in the following lemma.

Lemma 7: Consider the ML decoder and let $\theta_i = 1$, $1 \leq i \leq K$. Then if $\exists r \in \mathcal{R}(b)$ such that $$\sum_{j \in \mathcal{J}} r_j < b(\mathcal{J}), \forall \mathcal{J} \in S \text{ and } |\mathcal{J}| < K, \qquad (52)$$

$$\sum_{j=1}^{K} r_j = b(\{1, \ldots, K\}),$$

then the asymptotically tight affine approximation to the sum capacity simplifies to $$\tilde{C}^{ML}(1, \mathcal{E}) = b(\{1, \ldots, K\}) \log(\rho) + \log(\gamma_\infty^{ML}(1, \mathcal{E})), \qquad (53)$$

with $$\gamma_\infty^{ML}(1, \mathcal{E}) = \sup\{z : Pr(g(\tilde{H}\tilde{H}^\dagger, b(\{1, \ldots, K\})) < z) \leq \mathcal{E}\}. \qquad (54)$$

Thus at high SNR, in terms of sum capacity, the multi-user system behaves like its corresponding MIMO point-to-point system with N receive and $$\sum_{k=1}^{K} m_k$$

transmit antennas.

The proof of Lemma 7 is as follows. For this case with equal user priorities, note that $$C^{ML}(1, \varepsilon) = \qquad (55)$$

$$\sup \left\{ \sum_{k=1}^{K} R_k : Pr\left( \bigcup_{\mathcal{J} \in S} \left\{ \log|I + \rho \tilde{H}_{\mathcal{J}} \tilde{H}_{\mathcal{J}}^{\dagger}| < \sum_{k \in \mathcal{J}} R_k \right\} \right) \leq \varepsilon \right\}.$$

Suppose $r \in \mathcal{R}(b)$ satisfies (52). Setting $R_k = r_k \log(\rho) + \log(y_k)$ in (55) and proceeding along the lines of Appendix 4, we see that since $$\lim_{\rho \to \infty} Pr\left( \bigcup_{\mathcal{J} \in S} \left\{ \log|I + \rho \tilde{H}_{\mathcal{J}} \tilde{H}_{\mathcal{J}}^{\dagger}| < \sum_{k \in \mathcal{J}} [r_k \log(\rho) + \log(y_k)] \right\} \right) = \qquad (56)$$

-continued $$Pr\left( g(\tilde{H}\tilde{H}^\dagger, b(\{1, \ldots, K\})) < \prod_{k=1}^{K} y_k \right)$$

the asymptotically tight approximation to $C^{ML}(1, \mathcal{E})$ is given by (53). Next, note that the outage capacity for the corresponding point-to-point system with coding across transmit antennas, is given by $$C^{ML-Pt}(\mathcal{E}) = \sup\{R : Pr(\log|I + \rho \tilde{H}\tilde{H}^\dagger| < R) \leq R\} \leq \mathcal{E}\}. \qquad (57)$$

Setting $R = b(\{1, \ldots, K\}) \log(\rho) + \log(y)$ in (57), it can be shown that the asymptotically tight approximation to $C^{ML-Pt}(\mathcal{E})$ is also given by (53). As a consequence $$\lim_{\rho \to \infty} (C^{ML-pt}(\varepsilon) - C^{ML}(1, \varepsilon)) = 0, \qquad (58)$$

so that the multi-user capacity behaves like its corresponding MIMO point-to-point counterpart at high SNR.

The following theorem provides asymptotically tight affine approximations to the symmetric common outage capacity (41).

Theorem 8: For the ML decoder an asymptotically tight affine approximation to $C^{sym}(\mathcal{E})$ in (41) is given by $$\tilde{C}^{ML-sym}(\varepsilon) = r^*_{ML}\log(\rho) + \log(\gamma^{ML-sym}_\infty(\varepsilon)), \quad (59)$$

with $$r^*_{ML} = \min_{\mathcal{J} \in S}\{b(\mathcal{J})/|\mathcal{J}|\} \quad (60)$$

and $$\gamma^{ML-sym}_\infty(\varepsilon) = \quad (61)$$

$$\sup\left\{\gamma : Pr\left(\bigcup_{\substack{\mathcal{J} \in S \\ b(\mathcal{J})=|\mathcal{J}|r^*_{ML}}} \{g(\tilde{H}_\mathcal{J}\tilde{H}^\dagger_\mathcal{J}, b(\mathcal{J})) < y^{|\mathcal{J}|}\}\right) \le \varepsilon\right\}.$$

For the OSGD an asymptotically tight affine approximation to $C^{sym}(\varepsilon)$ is given by $$\tilde{C}^{OSGD-sym}(\varepsilon) = r^*_{OSGD}\log(\rho) + \log(\gamma^{OSGD-sym}_\infty(\varepsilon)), \quad (62)$$

with $$r^*_{OSGD} = \max_{(\mathcal{G}_1,\ldots,\mathcal{G}_p) \in Q}\left\{\min_{1 \le k \le p}\left\{\min_{\mathcal{J} \subseteq \mathcal{G}_k}\{h(\mathcal{J},\overline{\mathcal{G}}_k)/|\mathcal{J}|\}\right\}\right\} \quad (63)$$

and $$\gamma^{OSGD-sym}_\infty(\varepsilon) = \sup\left\{\gamma : Pr\left(\bigcap_{\mathcal{G} \in Q}\left\{\bigcup_{k=1}^p\left\{\bigcup_{\substack{\mathcal{J} \subseteq \mathcal{G}_k \\ h(\mathcal{J},\overline{\mathcal{G}}_k) \le |\mathcal{J}|r^*_{OSGD}}} \{g(\tilde{H}^\dagger_\mathcal{J} P^\perp_{\overline{\mathcal{G}}_k} \tilde{H}_\mathcal{J}, |\mathcal{J}|r^*_{OSGD}) < y^{|\mathcal{J}|}\}\right\}\right\}\right) \le \varepsilon\right\} \quad (64)$$

To prove Theorem 8, we first consider the ML decoder for which $$C_{ML-sym}(\mathcal{E}) = \sup\{R : Pr(\cup_{\mathcal{J} \ne \phi}\{\log|I + \rho\tilde{H}_\mathcal{J}\tilde{H}'_\mathcal{J}| < \mathcal{J}|R\}) \le \mathcal{E}\}. \quad (65)$$

Setting $R=r\log(\rho)+\log(y)$ and invoking (108) in Appendix 4, we see that the optimal scaling equals $$r^*_{ML} \triangleq \min_{\mathcal{J} \in S}\{b(\mathcal{J})/|\mathcal{J}|\}.$$

Using this and proceeding as before we can obtain an asymptotically tight approximation given in (61). To obtain an asymptotically tight approximation on the symmetric common outage capacity of the OSGD, we first need to determine the optimal scaling. Unlike the weighted common outage capacity case, here the scaling factor is in general less than that of the ML decoder. For any ordered partition $(\mathcal{G}_1, \ldots, \mathcal{G}_p)$ the maximum symmetric scaling can be determined as follows. Setting $R_k = r\log(\rho) + \log(y)$, we see from (112) in Appendix 4 that for this ordered partition the common outage event in the limit $\rho \to \infty$ is identical to the event $$\bigcup_{k=1}^p\left\{\bigcup_{\substack{\mathcal{J} \subseteq \mathcal{G}_k \\ h(\mathcal{J},\overline{\mathcal{G}}_k) \le |\mathcal{J}|r}} \{g(\tilde{H}^\dagger_\mathcal{J} P^\perp_{\overline{\mathcal{G}}_k} \tilde{H}_\mathcal{J}, |\mathcal{J}|r) < y^{|\mathcal{J}|}\}\right\} \quad (66)$$

From (66) we see that the maximum scaling supported by the ordered partition is $$\min_{1 \le k \le p}\left\{\min_{\mathcal{J} \subseteq \mathcal{G}_k}\{h(\mathcal{J},\overline{\mathcal{G}}_k)/|\mathcal{J}|\}\right\}. \quad (67)$$

The OSGD will achieve the maximum symmetric scaling over all valid ordered partitions that is given in (63). Note that $r_{OSGD}^*$ in (63) itself can be determined via a greedy algorithm similar to our previous greedy grouping one but where at each stage, $$\min_{\mathcal{J} \subseteq \mathcal{G}}\{h(\mathcal{J},\overline{\mathcal{G}})/|\mathcal{J}|\}$$

is maximized over valid ordered partitions of the form $\{\mathcal{G}, \overline{\mathcal{G}}\}$. With $r_{OSGD}^*$ in hand, we can set $R = r_{OSGD}^*\log(\rho) + \log(y)$ and determine that for the OSGD the common outage event in the limit $\rho \to \infty$ is identical to the event $$\bigcap_{\mathcal{G} \in Q}\left\{\bigcup_{k=1}^p\left\{\bigcup_{\substack{\mathcal{J} \subseteq \mathcal{G}_k \\ h(\mathcal{J},\overline{\mathcal{G}}_k) \le |\mathcal{J}|r^*_{OSGD}}} \{g(\tilde{H}^\dagger_\mathcal{J} P^\perp_{\overline{\mathcal{G}}_k} \tilde{H}_\mathcal{J}, |\mathcal{J}|r^*_{OSGD}) < y^{|\mathcal{J}|}\}\right\}\right\} \quad (68)$$

The asymptotically tight approximation given in (63) follows from (68).

Using the arguments in the proof given above, we can readily show that an asymptotically tight affine approximation to the symmetric common outage capacity of an SGD which employs a fixed partition $\{\mathcal{G}_1, \ldots, \mathcal{G}_p\}$ is given by $$\tilde{C}^{SGD-sym}(\varepsilon) = r^*_{OSGD}\log(\rho) + \log(\gamma_\infty^{SGD-sym}(\varepsilon)) \qquad (69)$$

with $$r^*_{SGD} = \min_{1\le k\le p}\left\{\min_{\mathcal{J}\subseteq\mathcal{G}_k}\{h(\mathcal{J},\mathcal{G}_k)/|\mathcal{J}|\}\right\} \qquad (70)$$

and $$\gamma_\infty^{SGD-sym}(\varepsilon) = \qquad (71)$$

$$\sup\left\{y:\Pr\left(\bigcup_{k=1}^p\left\{\bigcup_{\substack{\mathcal{J}\subseteq\mathcal{G}_k\\h(\mathcal{J},\mathcal{G}_k)\le|\mathcal{J}|r^*_{SGD}}}\{g(\tilde{H}_\mathcal{J}^\dagger P^\perp_{\mathcal{G}_k}\tilde{H}_\mathcal{J},|\mathcal{J}|r^*_{SGD}) < y^{|\mathcal{J}|}\}\right\}\right)\le\varepsilon\right\}$$

For the OSGD under the individual outage formulation we offer the following theorem. The proof is given in Appendix 5.

Theorem 9: The asymptotically tight affine approximations to $\mathcal{CI}(\theta,\mathcal{E})$ in (40) and $\mathcal{CI}^{sym}(\mathcal{E})$ in (42) are given respectively by $$\tilde{\mathcal{CI}}(\theta,\varepsilon) = \log(\rho)\sum_{k=1}^K \theta_k r^*_k + O(1) \qquad (72)$$

and $$\tilde{\mathcal{CI}}^{sym}(\varepsilon) = r^*_{OSGD}\log(\rho) + O(1). \qquad (73)$$

The following result determines the scaling of the throughput expressions in (43) and (44) with SNR.

Theorem 10: $\mathcal{T}(\theta)$ in (43) as well as $\mathcal{TI}(\theta)$ in (44) satisfy $$\lim_{\rho\to\infty}\frac{\mathcal{T}(\theta)}{\log(\rho)} = \lim_{\rho\to\infty}\frac{\mathcal{TI}(\theta)}{\log(\rho)} = \sum_{k=1}^K \theta_k r^*_k, \qquad (74)$$

where $\{r_k^*\}$ is given in (47).

To prove Theorem 10, we first note that $\mathcal{T}(\theta)$, $\mathcal{TI}(\theta)$ can be alternatively expressed as:

$$\mathcal{T}(\theta) = \sup_{\varepsilon\in(0,1)}\{(1-\varepsilon)\mathcal{C}(\theta,\varepsilon)\}, \qquad (75)$$

and $$\mathcal{TI}(\theta) = \sup_{\in(0,1)^K}\{\mathcal{CI}((1-\varepsilon)\cdot\theta,\varepsilon)\}$$

where $(1-\mathcal{E}).\theta\triangleq[(1-\mathcal{E}_1)\theta_1,\ldots,(1-\mathcal{E}_K)\theta_K]$. Consider $\mathcal{T}(\theta)$. Using (75) and the asymptotically tight affine approximation for $(,\mathcal{E})$ in (48), we can infer that at high SNR $$\mathcal{T}(\theta) \ge (1-\varepsilon)\log(\rho)\sum_{k=1}^K \theta_k r^*_k + (1-\varepsilon)\log(\gamma_\infty(\theta,\varepsilon)), \qquad (76)$$

and $$\mathcal{T}(\theta) \le \log(\rho)\sum_{k=1}^K \theta_k r^*_k + \sup_{\varepsilon\in(0,1)}\{(1-\varepsilon)\log(\gamma_\infty(\theta,\varepsilon))\},\ \varepsilon\in(0,1).$$

Since the terms independent of $\rho$ in the LHS and RHS of (76) are finite, we can conclude that $$(1-\varepsilon)\sum_{k=1}^K \theta_k r^*_k \le \lim_{\rho\to\infty}\frac{\mathcal{T}(\theta)}{\log(\rho)} \le \sum_{k=1}^K \theta_k r^*_k,\ \forall\,\varepsilon\in(0,1). \qquad (77)$$

From (77) it follows that the scaling of $\mathcal{T}(\theta)$ is equal to $$\sum_{k=1}^K \theta_k r^*_k.$$

A similar argument works for $\mathcal{TI}(\theta)$ also.

4.2 Large Array Regime

In this section we consider the SGD with the group size constraint and characterize the limiting capacity behavior [corresponding to (39), (40), (41) and (42)] as well as the limiting throughput behavior [corresponding to (43) and (44)], as both the number of users and the number of receive antennas grow to infinity. For simplicity, we consider a symmetric MAC (SMAC) where all users have an identical number (equal to m) of transmit antennas and we assume that all fading coefficients are i.i.d. random variables with zero-mean and unit variance. We keep m fixed and let $K, N\to\infty$ such that $\beta=mK/N$ is constant. Also, each user's input covariance matrix is set as $$\frac{\rho}{Km}I,$$

so that the total transmit power in the system remains fixed at $\rho$. It is a well-known result (see, e.g., A. Lozano, "Capacity-approaching rate function for layered multiantenna architectures," *IEEE Trans. Wireless Commun.*, vol. 2, no. 4, pp. 616-620, July 2003 and the references therein) that due to the almost sure convergence of the singular values of H, the mutual-information random variables tend to their deterministic (ergodic) limits (a.k.a. channel hardening effect). As a consequence, asymptotically—in the large array regime— the channel-dependent grouping algorithm is irrelevant and there is no difference between the common and individual outage formulations. Successive group decoding, however, can still yield capacity gains commensurate with the maximum group size allowed.

We first consider the weighted sum capacity (39) or (40). As a result of the channel hardening effect and the fact that MMSE-SIC achieves the corner point of the (ergodic) MAC capacity region, we can conclude that an asymptotically optimal solution to (39) or (40) for any OSGD is identical and the optimal rate allocation corresponds to the corner-point determined by the non-increasing order of user priorities. Further, since the outage probabilities tend to indicator functions (which equal to one if the rate is greater than the corresponding deterministic capacity and zero otherwise) both the common as well as individual throughput, given by (43) and (44) respectively, are asymptotically identical to the (common or individual) outage capacity.

Now let us consider the more involved case of symmetric outage capacity. We first consider the ML decoder from which we note that the limiting sum capacity (per receive antenna) can be expressed as the following integral $$C_\infty(\beta, \rho) \triangleq \lim_{N\to\infty} \frac{1}{N} \log\left|I + \frac{\rho}{Km}HH^\dagger\right| \quad (78)$$

$$= \int_0^\beta \log(1 + \rho/\beta - F(x, \rho/\beta)) dx$$

$$= \log(1 + \rho - F(\beta, \rho/\beta)) + \beta\log(1 + \rho/\beta - F(\beta, \rho/\beta)) - \beta\frac{\log(e)}{\rho}F(\beta, \rho/\beta)$$

with $$F(x, y) \triangleq \frac{1}{4}\left[\sqrt{1 + y(1 + \sqrt{x})^2} - \sqrt{1 + y(1 - \sqrt{x})^2}\right]^2. \quad (79)$$

See A. Lozano, "Capacity-approaching rate function for layered multiantenna architectures," *IEEE Trans. Wireless Commun.*, vol. 2, no. 4, pp. 616-620, July 2003.

To extend this result to the symmetric capacity, we offer the following theorem whose proof is given in Appendix 6.

Theorem 11: The limiting symmetric capacity of any SGD (optimal or otherwise), denoted by $C_\infty^{sym-SGD}(\beta, \rho)$, is given by $$C_\infty^{sym-SGD}(\beta, \rho) = \frac{1}{\delta}\int_{\beta-m\delta}^\beta \log(1 + \rho/\beta - F(x, \rho/\beta)) dx \quad (80)$$

$$= \frac{1}{\delta}[C_\infty(\beta, \rho) - C_\infty(\beta - m\delta, \rho(\beta - m\delta)/\beta)],$$

where $$\delta \triangleq \lim_{N\to\infty} \frac{|\mathcal{G}_1|}{N}$$

represents the asymptotic ratio of the number of users jointly decoded in the first group to the number of receive antennas.

The limiting symmetric capacities of the special cases of the SGD are given in the following corollary.

Corollary 1: The limiting symmetric capacities of the ML and the unconstrained SGD in the large array regime are identical and given by $$C_\infty^{sym-ML}(\beta, \rho) = \frac{m}{\beta}C_\infty(\beta, \rho), \quad (81)$$

whereas that of the MMSE-SIC equals to $$C_\infty^{sym-SIC}(\beta,\rho) = m\log(1+\rho/\beta-F(\beta,\rho/\beta)). \quad (82)$$

Note that in (80) since $\log(1+\rho/\beta-F(x,\rho/\beta,))$ is non-increasing in x when $x \in (0,\beta)$, the symmetric capacity of the SGD monotonically increases with the group size parameter $\delta$. Also note that the symmetric capacity operating point is no longer sum capacity optimal and the loss (per receive antenna) can be quantified as $$C_\infty(\beta, \rho) - \frac{K}{N}C_\infty^{sym-SGD}(\beta, \rho) = \quad (83)$$

$$\frac{\beta}{m\delta}C_\infty(\beta - m\delta, \rho(\beta - m\delta)/\beta) - \left(\frac{\beta}{m\delta} - 1\right)C_\infty(\beta, \rho).$$

It is insightful to examine the large array symmetric capacity asymptote in the high SNR regime. To do so we first determine the high SNR behaviour of $C_\infty(\beta,\rho)$ in (79) to be $$C_\infty(\beta, \rho) = \begin{cases} \log(\rho/e) - (\beta-1)\log(1-1/\beta) + O(1/\rho), & \beta \geq 1, \\ \beta\log(\rho/(\beta e)) - (1-\beta)\log(1-\beta) + O(1/\rho), & \beta \leq 1. \end{cases} \quad (84)$$

Using (80) and (84), we can readily obtain the high SNR behavior of $C_\infty^{sym-SGD}(\beta,\rho)$ as follows, where we drop the $\mathcal{O}(1/\rho)$ terms:

$$C_\infty^{sym-SGD}(\beta, \rho) \sim \begin{cases} \frac{1}{\delta}[m\delta\log(\rho/(\beta e)) - (1-\beta)\log(1-\beta) + (1+m\delta-\beta)\log(1+m\delta-\beta)], & \beta \leq 1, \\ \frac{1}{\delta}[(1-\beta+m\delta)\log(\rho(1+m\delta-\beta)) + (\beta-m\delta)\log(\beta e) - \log(e) \\ -(\beta-1)\log(1-1/\beta)] & \beta \in [1, 1+m\delta], \\ \frac{1}{\delta}[-(\beta-1)\log(\beta-1) + \beta\log(\beta) + (\beta-m\delta-1)\log(\beta-m\delta-1) \\ -(\beta-m\delta)\log(\beta-m\delta)], & \beta \geq 1+m\delta. \end{cases} \quad (85)$$

Note that there is no growth of the symmetric capacity with $\log(\rho)$ in the case of $\beta \geq 1+m\delta$, i.e., when $$m\frac{K - |\mathcal{G}_1|}{N} > 1$$

in the large array limit. This happens because users decoded in the first group become the bottleneck since they see too much interference from remaining users and can only support a constant (common) rate in the high SNR regime. Note that (85) also provides us with the limiting expressions for the $\mathcal{O}(1)$ terms in the affine approximations to the symmetric capacities computed above, in the limit of large array sizes and when $\partial_k=1$, $A_k=I$, $B_k=I$, $B_k=I$, $k=1, \ldots, K$.

4.3 Numerical Results

For convenience, in the following simulations we assume i.i.d. Rayleigh fading and that all users transmit with identical average powers. Our focus is on the symmetric outage capacities. In order to compute the high-SNR asymptotes we must first determine the optimal scaling factors $r_{ML}^*$, $r_{OSGD}^*$ and $r_{SGD}^*$ given in (60), (63) and (70), respectively. From the formulae, we see that we need to determine $b(\mathcal{J})=\text{rank}(\tilde{H}_\mathcal{J})$ for all non-empty subsets, $\mathcal{J} \in \mathcal{S}$. (Recall that $h(\mathcal{J}, \bar{\mathcal{G}}_k) = b(\mathcal{J}, \bar{\mathcal{G}}_k) - b(\mathcal{J}, \bar{\mathcal{G}}_k)$.) Invoking Lemma 5, which says that for any $\mathcal{J} \in \mathcal{S}$, $\text{rank}(\tilde{H}_\mathcal{J})$ equals a constant with probability one, we can determine $\{b(\mathcal{J})\}$ by generating one realization of $\tilde{H}$ and computing the ranks of all $\{\tilde{H}_\mathcal{J}\}$. However in the following examples, since $\tilde{H}$ has i.i.d. zero-mean complex normal elements, we have that $b(\mathcal{J})=\text{rank}(\tilde{H}_\mathcal{J})=\min\{N, \Sigma_{\omega\mathcal{J}} m_k\}$, $\forall \mathcal{J} \in \mathcal{S}$.

Figure 9:
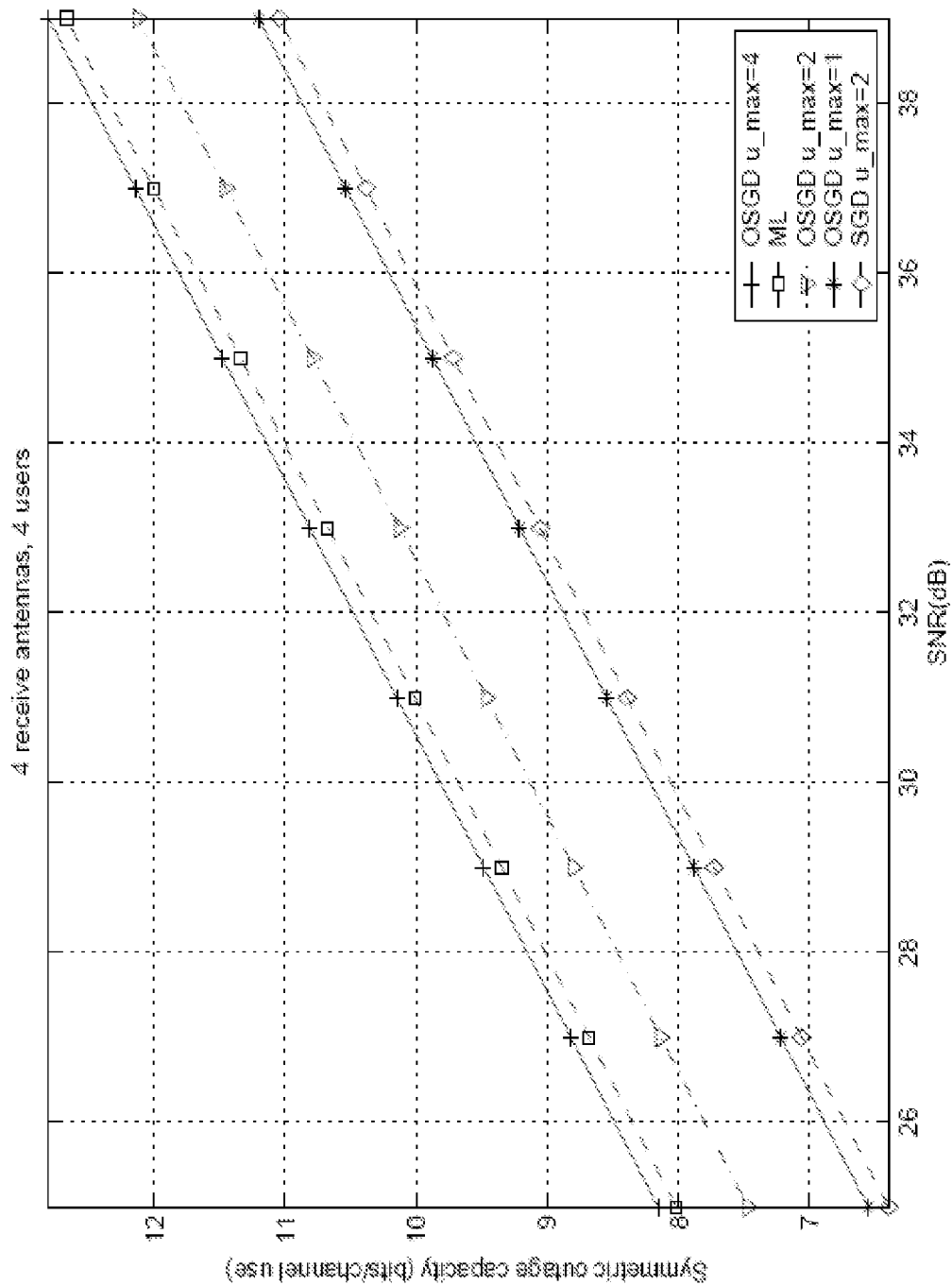
FIG. 9 is a chart of symmetric outage capacity versus SNR for an ML decoder, an SGD and an OSGD operating with different group sizes.

In FIG. 9 we plot the asymptotically tight high SNR affine approximations (asymptotes) on the symmetric outage capacity obtained in Theorems 8 and 9, for a MAC with $N=K=4$, $m_k=1$, $\forall k$ and $\mathcal{E}=0.1$. We plot the individual symmetric outage capacity high-SNR asymptote for the unconstrained (i.e., $\mu_{max}=4$) OSGD (73) and the common symmetric outage capacity high-SNR asymptotes ((59), (62) and (69)) for the rest. The SGD considered here uses a fixed ordered partition $\{\{1,2\},\{3,4\}\}$ for every channel realization. In this example we can analytically verify that $r_{ML}^*=r_{OGSD}^*=r_{SGD}^*=1$. In each case the $\mathcal{O}(1)$ terms involved in the affine asymptotes were computed through Monte-Carlo simulations. As shown in FIG. 9, the unconstrained OSGD improves only marginally on the ML decoder, highlighting the fact, however, that the common outage capacity of the ML decoder is not the best achievable. Note that even the OSGD with $\mu_{max}=1$ improves upon the SGD with a fixed ordered partition of higher complexity.

Figure 10:
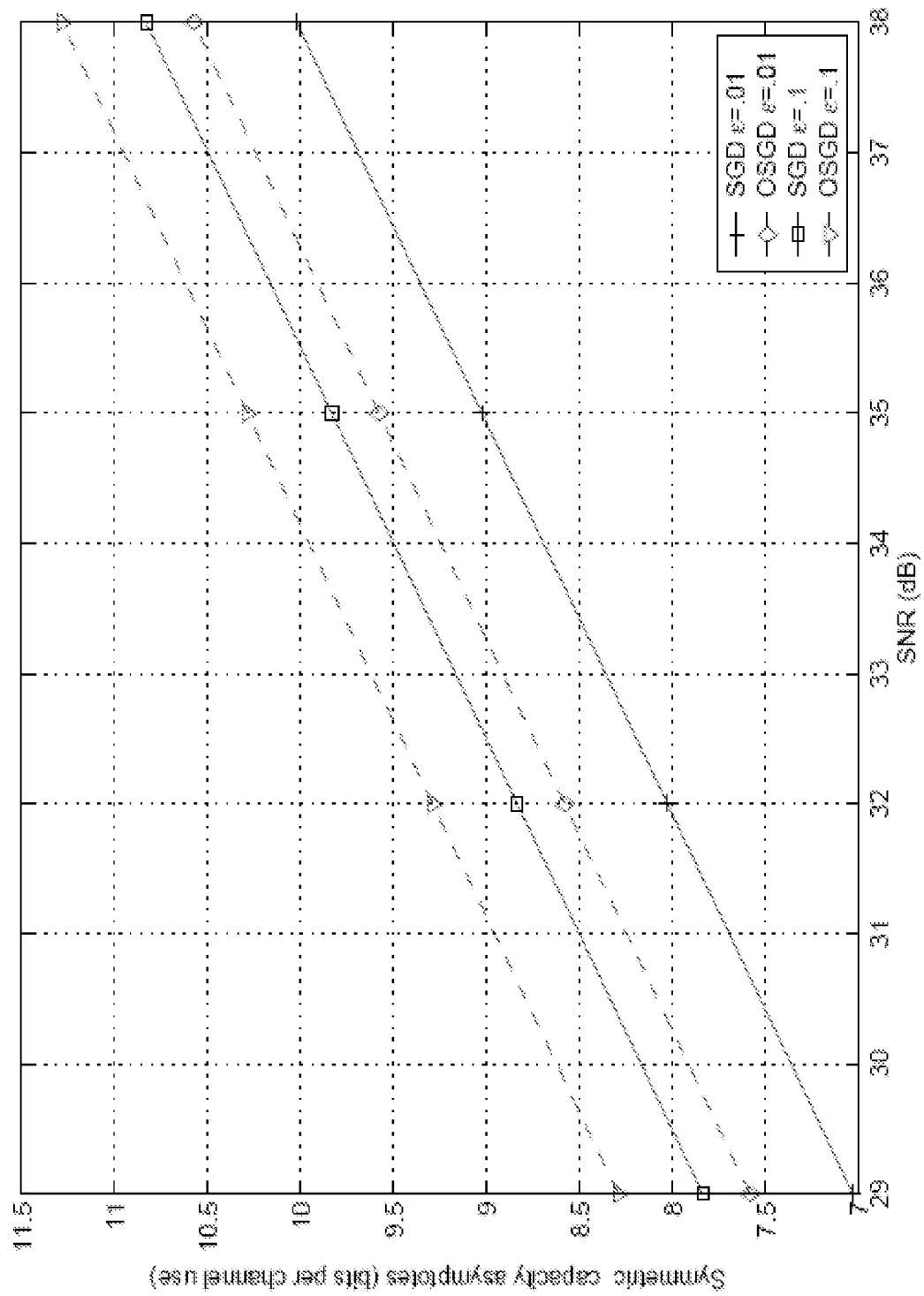
FIG. 10 is a chart of the symmetric common outage capacity asymptotes corresponding to an OSGD with $\mu_{max}=2$ and an SGD with a fixed partition $\{\{1,2\},3\}$ for $\in=0.01$ and $\in=0.1$, respectively.

FIG. 10 plots the symmetric common outage capacity asymptotes for a MAC with $N=4$, $K=3$ and $$m_k = 2, \tilde{Q}_k = \frac{1}{6} I \; \forall \; k.$$

The asymptote corresponding to the OSGD with $\mu_{max}=2$ (62) and that of an SGD with a fixed partition $\{\{1, 2\}, 3\}$ (69) for $\mathcal{E}=0.01$ and $\mathcal{E}=0.1$, respectively, are plotted. It can be verified that $r_{OSGD}^*=r_{SGD}^*=1$. The optimal grouping is seen to provide a gain of about 1.8 dB for $\mathcal{E}=0.01$ and about 1.5 dB for $\mathcal{E}=0.1$. Using (59) we can also verify that the ML decoder yields, $r_{ML}^*=4;3$ whereas the OSGD with $\mu_{max}=1$ and hence any SGD with $\mu_{max}=1$ yield $r_{OSGD}^*=r_{SGD}^*=0$. Moreover from (69) we can also infer that the SGDs corresponding to (fixed) partitions $\{1,\{2,3\}\}$, $\{2,\{1,3\}\}$ and $\{3,\{1,2\}\}$ all yield $r_{SGD}^*=0$.

Figure 11:
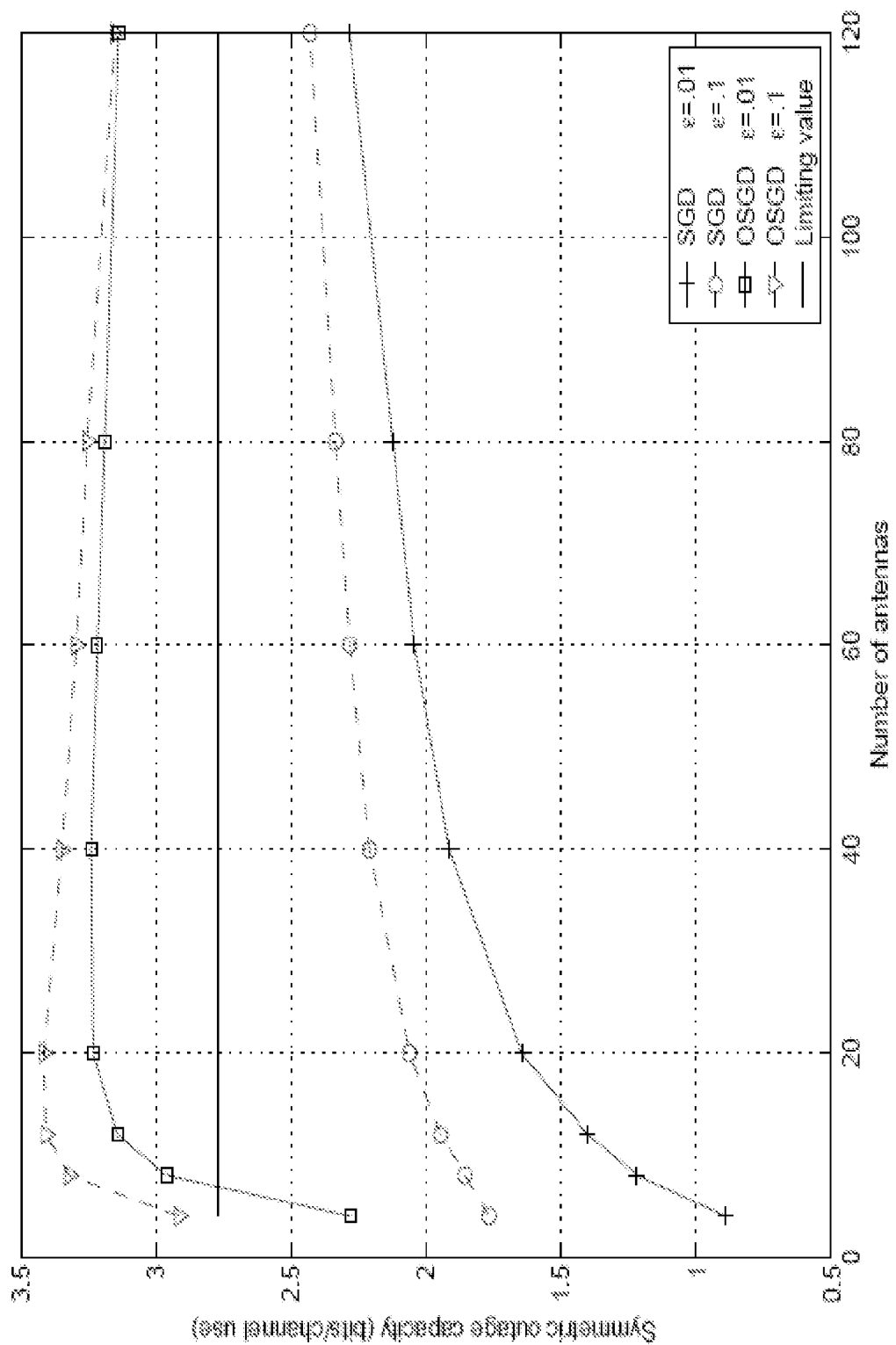
FIG. 11 is a chart of symmetric outage capacity versus number of antennas for an SGD and an OSGD with $\mu_{max}=1$ and $\in=0.1$ and $\in=0.01$.

In FIG. 11 we consider the limiting (large array) symmetric outage capacity. We set $N=K$ with $m_k=1$, $\forall k$ and fix the total transmit power in the system at $\rho=16$ dB. We plot the simulated symmetric common outage capacities of the SGD and the OSGD with $\mu_{max}=1$ and $\mathcal{E}=0.1$ and $\mathcal{E}=0.01$ (41), along with the capacity obtained in the limit $K \to \infty$ with $\beta=1$ (82), which for our choice of parameters equals 2.77 bits per channel use. The symmetric outage capacity of the SGD is monotonically increasing towards its limiting value. Note that although the OSGD and the SGD have identical limiting capacity since grouping (ordering) is asymptotically irrelevant, as seen from the figure the rate of convergence is very slow. This implies that for all practical MIMO MAC configurations, optimal grouping results in substantial gain in terms of the outage capacity.

Figure 12:
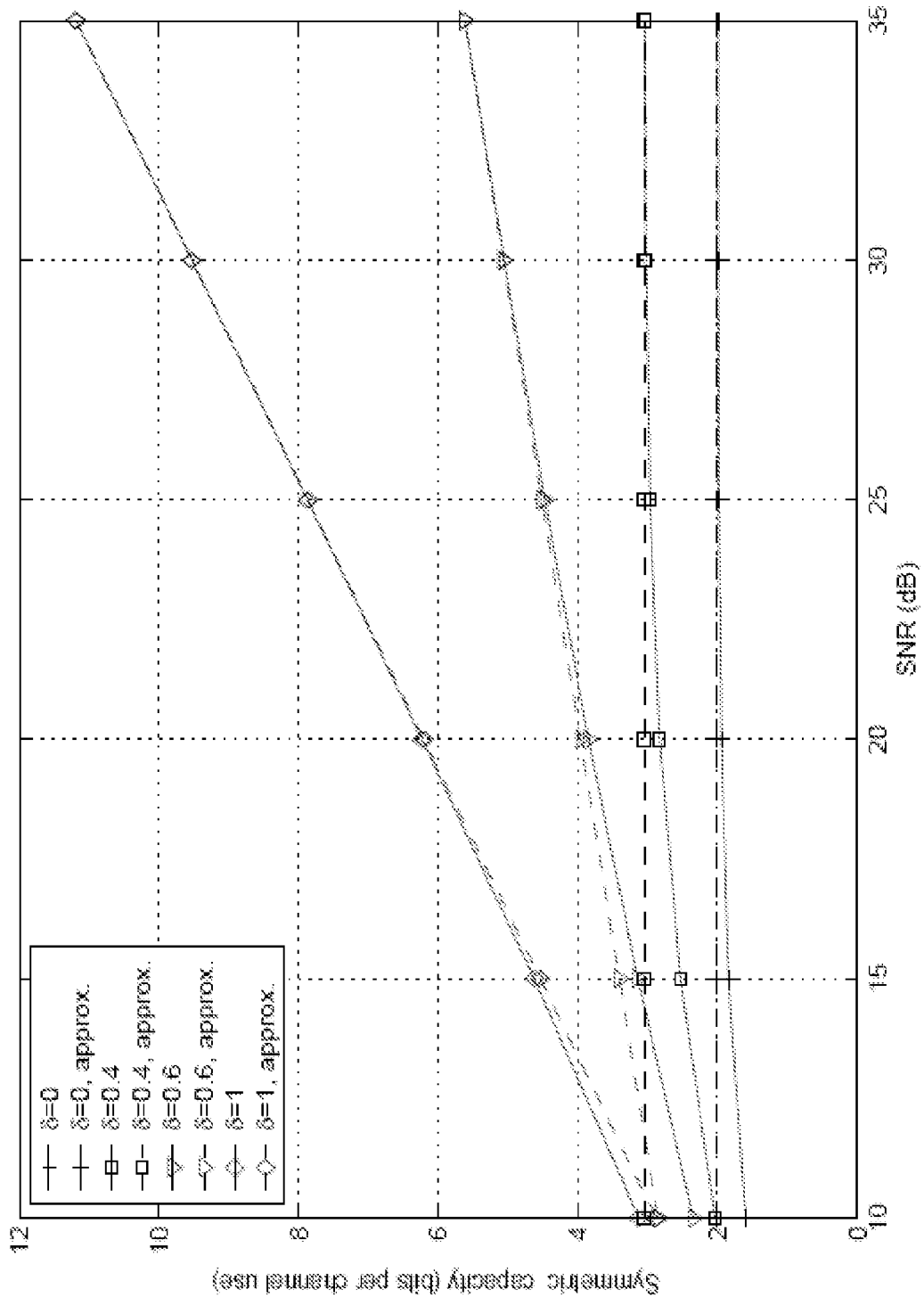
FIG. 12 is a chart of symmetric capacity versus SNR for an SGD with various group size parameter ($\delta$) values.

In FIG. 12 we again consider the limiting (large array) symmetric outage capacity and set $N=K$ with $m_k=2$, $\forall k$ so that $\beta=2$. FIG. 12 plots $\mathcal{C}_\infty^{sym\text{-}SGD}(\beta, \rho)$ (given in (80)) versus $\rho$ for several values of $\delta$ along with its large $\rho$ approximation given in (85). From the plot it is seen that the high SNR approximation becomes tight even at moderate SNRs. In this example for any asymptotic group size $\delta \in [0,1/2]$, the symmetric capacity approaches an upperbound (given by (85)) with increasing SNR, so its scaling factor with $\log(\rho)$ is zero. On the other hand, for $\delta \in [\frac{1}{2},1]$, the scaling factor equals $$2 - \frac{1}{\delta}$$

and monotonically increases with $\delta$.

An optimal successive group decoder (OSGD) that simultaneously minimizes the common and individual outage probabilities as well as maximizes the error exponent has been disclosed. An adaptive SGD has been proposed which retains the outage optimality of the OSGD but minimizes the average decoding complexity. Asymptotically tight affine approximations have been obtained for the relevant performance metrics. Limiting expressions for the relevant capacities as the number of users and the number of receive antennas approach infinity show that SGD yields symmetric capacity gains commensurate with the decoding complexity allowed.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A joint scheduling and grouping method for throughput maximization for an uplink space-division multiple access (SDMA) system operating under proportional fairness constraints, the uplink SDMA system including a receiver that employs parallel group decoding, has multiple receive antennas, and can communicate with each of a plurality of users via a downlink channel of limited capacity, the method comprising:

specifying a decoding complexity constraint including a maximum group size;

specifying a transmit power for each of the plurality of users;

determining an uplink channel realization for each of the plurality of users;

determining an optimal assignment of user rates and a partition including one or more groups of users that have been assigned positive rates, wherein the partition satisfies the decoding complexity constraint, and wherein the partition and the corresponding assigned user rates satisfy a non-outage condition in which all groups of the partition are decodable given the specified transmit powers and uplink channel realizations;

communicating the user rates to the plurality of users using the downlink channel; and group decoding, in accordance with the partition, uplink communications received from the plurality of users, wherein the partition includes a plurality of groups which satisfy the decoding complexity constraint, no two of the groups can be combined without violating the decoding complexity constraint, and the method comprises:

assigning rates to the users in each group in the partition such that each group is decodable when treating the remaining users in the partition as interferers;

wherein a group is decodable if an associated metric satisfies a predetermined condition, the metric being responsive to the rates assigned to the users in the group, the uplink channel realizations for the users in the group and for the remaining users in the partition treated as interferers, and the transmit powers for the users in the group and for the remaining users in the partition treated as interferers.

2. The method of claim 1, wherein a group is decodable if $$M(A) = \min_{J \subseteq A} \left[ \frac{\log \left| I + (\tilde{H}^J)^* (I + \tilde{H}^B (\tilde{H}^B)^*)^{-1} \tilde{H}^J \right|}{\sum_{k \in J} R_k} \right]^+ > 1,$$

where A is the group of users, B is the set of users treated as interferers, $\tilde{H}^J$ includes the channel realizations and transmit powers for users in set J, and $\tilde{H}^B$ includes the channel realizations and transmit powers for users in the set B.

3. The method of claim 1, wherein a group is decodable if $$M(A) = \min_{J \subseteq A} \left\{ \left( \log \left| I + (\tilde{H}^J)^* (I + \tilde{H}^B (\tilde{H}^B)^*)^{-1} \tilde{H}^J \right| - \sum_{k \in J} R_k \right)^+ \right\} > 0,$$

where A is the candidate group of users, B is the set of users treated as interferers, $\tilde{H}^J$ includes the channel realizations and transmit powers for users in set J, and $\tilde{H}^B$ includes the channel realizations and transmit powers for users in the set B.

4. A joint scheduling and grouping method for throughput maximization for an uplink space-division multiple access (SDMA) system operating under proportional fairness constraints, the uplink SDMA system including a receiver that employs group decoding, has multiple receive antennas, and can communicate with each of a plurality of users via a downlink channel of limited capacity, the method comprising:

specifying a decoding complexity constraint including a maximum group size;

specifying a transmit power for each of the plurality of users;

determining an uplink channel realizations for each of the plurality of users;

determining an optimal assignment of user rates and a partition including one or more groups of users that have been assigned positive rates, wherein the partition satisfies the decoding complexity constraint, and wherein the partition and the corresponding assigned user rates satisfy a non-outage condition in which all groups of the partition are decodable given the specified transmit powers and uplink channel realizations;

communicating the user rates to the plurality of users using the downlink channel; and group decoding, in accordance with the partition, uplink communications received from the plurality of users, wherein the uplink SDMA system employs Hybrid ARQ and the method comprises:

specifying a maximum number of transmissions parameter L;

assigning rates to the users in each group in the partition such that each group is decodable when treating the remaining users as interferers;

wherein a group is decodable if an associated metric satisfies a predetermined condition, the metric being responsive to:

the rates assigned to the users in the group, the transmit powers for the users in the group, the uplink channel realizations for the users in the group in a current frame and the previous L-1 frames, the number of re-transmissions that have occurred for each user in the group, the transmit powers for the interfering users in the current frame and the previous L-1 frames, and the uplink channel realizations for the interfering users in the current frame and the previous L-1 frames.

5. A joint scheduling and grouping method for throughput maximization for an uplink space-division multiple access (SDMA) system operating under proportional fairness constraints, the uplink SDMA system including a receiver that employs successive group decoding, has multiple receive antennas, and can communicate with each of a plurality of users via a downlink channel of limited capacity, the method comprising:

specifying a decoding complexity constraint including a maximum group size;

specifying a transmit power for each of the plurality of users;

determining an uplink channel realizations for each of the plurality of users;

determining an optimal assignment of user rates and a partition including one or more groups of users that have been assigned positive rates, wherein the partition satisfies the decoding complexity constraint, and wherein the partition and the corresponding assigned user rates satisfy a non-outage condition in which all groups of the partition are decodable given the specified transmit powers and uplink channel realizations;

communicating the user rates to the plurality of users using the downlink channel; and group decoding, in accordance with the partition, uplink communications received from the plurality of users, wherein the partition is an ordered partition whose elements are groups of users having cardinalities that are no greater than the maximum group size and wherein determining an optimal assignment of user rates and a partition of users that have been assigned positive rates includes:

i) determining a reduced set of users from the plurality of users by removing each user having a zero proportional fairness weight and each user having a minimum rate that cannot be supported in a single-user configuration;

ii) determining a plurality of candidate groups of users from the reduced set of users such that each candidate group of users has a size no greater than the maximum group size;

iii) assigning rates to the users in the candidate groups such that the candidate groups are decodable when treating the remaining users in the reduced set of users as interferers;

iv) selecting the candidate group having the greatest weighted sum rate;

v) appending the selected candidate group into an ordered partition and removing the users in the selected candidate group from the reduced set of users;

vi) removing a user from the reduced set of users if the selected candidate group is empty; and vii) repeating steps ii through vi until the reduced set of users is empty.

6. The method of claim 5, wherein a candidate group is decodable if an associated metric satisfies a predetermined condition, the metric being responsive to the rates assigned to the users in the candidate group, the uplink channel realizations for the users in the candidate group and for the users in the reduced set of users that are treated as interferers, and the transmit powers for the users in the group and for the users in the reduced set of users that are treated as interferers.

7. The method of claim 6, wherein a candidate group is decodable if $$M(A) = \min_{J \subseteq A} \left[ \frac{\log|I + (\tilde{H}^J)^*(I + \tilde{H}^B(\tilde{H}^B)^*)^{-1}\tilde{H}^J|}{\sum_{k \in J} R_k} \right]^+ > 1,$$

where A is the candidate group of users, B is the set of users treated as interferers, $\tilde{H}^J$ includes the channel realizations and transmit powers for users in set J, and $\tilde{H}^B$ includes the channel realizations and transmit powers for users in the set B.

8. The method of claim 6, wherein a candidate group is decodable if $$M(A) = \min_{J \subseteq A} \left\{ \left( \log|I + (\tilde{H}^J)^*(I + \tilde{H}^B(\tilde{H}^B)^*)^{-1}\tilde{H}^J| - \sum_{k \in J} R_k \right)^+ \right\} > 0,$$

where A is the candidate group of users, B is the set of users treated as interferers, $\tilde{H}^J$ includes the channel realizations and transmit powers for users in set J, and $\tilde{H}^B$ includes the channel realizations and transmit powers for users in the set B.

9. A joint scheduling and grouping method for throughput maximization for an uplink space-division multiple access (SDMA) system operating under proportional fairness constraints, the uplink SDMA system including a receiver that employs successive group decoding, has multiple receive antennas, and can communicate with each of a plurality of users via a downlink channel of limited capacity, the method comprising:
  specifying a decoding complexity constraint including a maximum group size;
  specifying a transmit power for each of the plurality of users;
  determining an uplink channel realizations for each of the plurality of users;
  determining an optimal assignment of user rates and a partition including one or more groups of users that have been assigned positive rates, wherein the partition satisfies the decoding complexity constraint, and wherein the partition and the corresponding assigned user rates satisfy a non-outage condition in which all groups of the partition are decodable given the specified transmit powers and uplink channel realizations;
  communicating the user rates to the plurality of users using the downlink channel; and
  group decoding, in accordance with the partition, uplink communications received from the plurality of users, wherein the partition is an ordered partition whose elements are groups of users having cardinalities that are no greater than the maximum group size and wherein determining an optimal assignment of user rates and a partition of users that have been assigned positive rates includes:
  i) determining a reduced set of users from the plurality of users by removing each user having a zero proportional fairness weight and each user having a minimum rate that cannot be supported in a single-user configuration;
  ii) determining a plurality of candidate groups of users from the reduced set of users such that each candidate group of users has a size no greater than the maximum group size;
  iii) assigning rates to the users in the candidate groups such that the candidate groups are decodable when treating users that have previously been assigned positive rates as interferers;
  iv) selecting the candidate group having the greatest weighted sum rate;
  v) prepending the selected candidate group into an ordered partition and removing the users in the selected candidate group from the reduced set of users; and
  vi) repeating steps ii through v until the selected candidate group of users is empty.

10. The method of claim 9, wherein a candidate group is decodable if an associated metric satisfies a predetermined condition, the metric being responsive to the to the rates assigned to the users in the candidate group, the uplink channel realizations for the users in the candidate group and for the users that are treated as interferers, and the transmit powers for the users in the group and for the users that are treated as interferers.

11. The method of claim 10, wherein a candidate group is decodable if $$M(A) = \min_{J \subseteq A} \left[ \frac{\log|I + (\tilde{H}^J)^*(I + \tilde{H}^B(\tilde{H}^B)^*)^{-1}\tilde{H}^J|}{\sum_{k \in J} R_k} \right]^+ > 1,$$

where A is the candidate group of users, B is the set of users treated as interferers, $\tilde{H}^J$ includes the channel realizations and transmit powers for users in set J, and $\tilde{H}^B$ includes the channel realizations and transmit powers for users in the set B.

12. The method of claim 10, wherein a candidate group is decodable if $$M(A) = \min_{J \subseteq A} \left\{ \left( \log|I + (\tilde{H}^J)^*(I + \tilde{H}^B(\tilde{H}^B)^*)^{-1}\tilde{H}^J| - \sum_{k \in J} R_k \right)^+ \right\} > 0,$$

where A is the candidate group of users, B is the set of users treated as interferers, $\tilde{H}^J$ includes the channel realizations and transmit powers for users in set J, and $\tilde{H}^B$ includes the channel realizations and transmit powers for users in the set B.

* * * * *